US012574810B2

(12) United States Patent
Thakur et al.

(10) Patent No.: US 12,574,810 B2
(45) Date of Patent: Mar. 10, 2026

(54) STATION IDENTIFIER OPT-IN

(71) Applicant: Apple Inc., Cupertino, CA (US)

(72) Inventors: Sidharth R. Thakur, Los Gatos, CA (US); Jarkko L. Kneckt, Los Gatos, CA (US); Elliot S. Briggs, Santa Cruz, CA (US); Yong Liu, Campbell, CA (US); Su Khiong Yong, Palo Alto, CA (US); Charles F. Dominguez, San Carlos, CA (US); Daniel R. Borges, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 327 days.

(21) Appl. No.: 18/213,103

(22) Filed: Jun. 22, 2023

(65) Prior Publication Data

US 2024/0015608 A1    Jan. 11, 2024

Related U.S. Application Data

(60) Provisional application No. 63/406,896, filed on Sep. 15, 2022, provisional application No. 63/388,133, filed on Jul. 11, 2022.

(51) Int. Cl.
| | |
|---|---|
| *H04W 36/00* | (2009.01) |
| *H04W 12/06* | (2021.01) |
| *H04W 12/08* | (2021.01) |
| *H04W 12/69* | (2021.01) |
| *H04W 84/12* | (2009.01) |

(52) U.S. Cl.
CPC ............................... *H04W 36/0055* (2013.01)

(58) Field of Classification Search
CPC ......... H04W 74/0833; H04W 74/0836; H04W 36/0055; H04W 12/06; H04W 12/08; H04W 12/69; H04W 84/12
See application file for complete search history.

(56) References Cited

U.S. PATENT DOCUMENTS

| | | | | |
|---|---|---|---|---|
| 2008/0065884 A1* | 3/2008 | Emeott | ................ | H04L 9/0838 |
| | | | | 713/168 |
| 2010/0332822 A1* | 12/2010 | Liu | ...................... | H04W 12/041 |
| | | | | 713/151 |
| 2011/0150223 A1* | 6/2011 | Qi | ......................... | H04L 9/0891 |
| | | | | 380/273 |
| 2011/0154038 A1* | 6/2011 | Qi | ......................... | H04W 12/50 |
| | | | | 380/34 |

(Continued)

*Primary Examiner* — Jenee Holland
(74) *Attorney, Agent, or Firm* — Sterne, Kessler, Goldstein & Fox P.L.L.C.

(57) ABSTRACT

Embodiments are disclosed for station (STA) identifier opt-in. Some embodiments include a STA that can associate with an access point (AP) of a wireless network, where the STA is configured to opt-in to being identified by the AP. The STA can transmit a first message 2 (M2) of a 4-way handshake protocol during the association, where the first M2 includes a Device Identifier (ID) Key Data Encapsulation (KDE) that includes an Opt-in Control field, where a first value of the Opt-in Control field indicates the STA opts-in to being identified by the AP. The STA can receive a first message 3 (M3) of the 4-way handshake protocol including a Device ID KDE and an ID Blob, where the ID Blob corresponds to the STA. The STA can communicate with the AP, where the first value enables the AP to collect data about the STA during the communication.

14 Claims, 14 Drawing Sheets

Network 150

Access Point (AP) 110
(e.g., base station)

Non-AP Station (STA) 120
(e.g., User Equipment (UE))

100

(56)                References Cited

U.S. PATENT DOCUMENTS

| 2011/0154039 | A1* | 6/2011 | Liu | ..................... | H04L 63/0869 |
| | | | | | 713/168 |
| 2020/0146101 | A1* | 5/2020 | Tsuboi | .............. | H04W 56/0045 |
| 2021/0345105 | A1* | 11/2021 | Peer | .................. | H04W 12/0433 |
| 2021/0392494 | A1* | 12/2021 | Huang | .................. | H04W 12/76 |
| 2023/0208617 | A1* | 6/2023 | Smith | .................. | H04W 12/71 |
| | | | | | 713/171 |
| 2023/0328030 | A1* | 10/2023 | Smith | ................ | H04L 61/5038 |
| 2023/0388117 | A1* | 11/2023 | Inohiza | ................ | H04L 9/0833 |

* cited by examiner

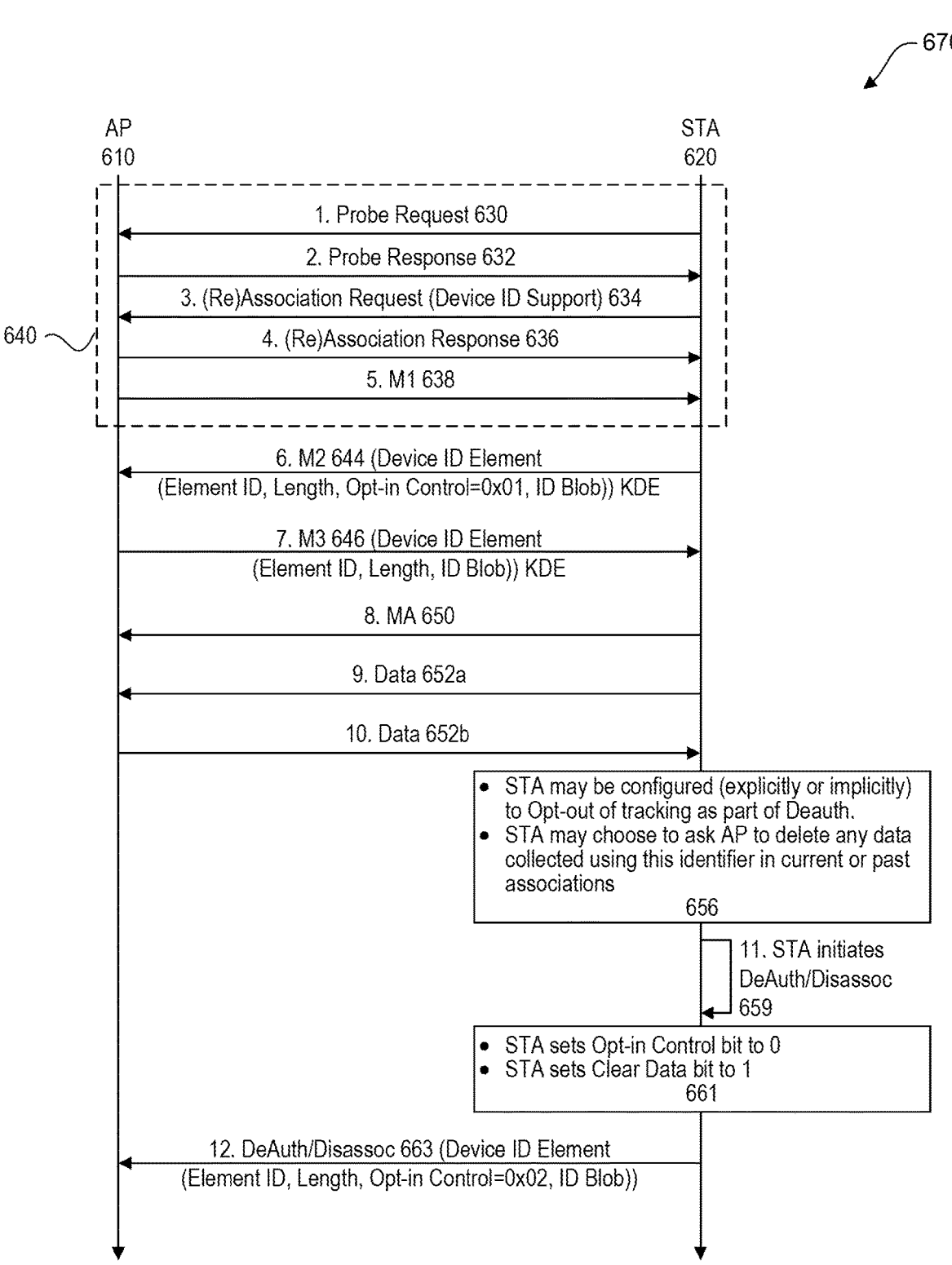

670

AP
610

STA
620

1. Probe Request 630

2. Probe Response 632

3. (Re)Association Request (Device ID Support) 634

4. (Re)Association Response 636

5. M1 638

640

6. M2 644 (Device ID Element
(Element ID, Length, Opt-in Control=0x01, ID Blob)) KDE 7. M3 646 (Device ID Element
(Element ID, Length, ID Blob)) KDE

8. MA 650

9. Data 652a

10. Data 652b

- STA may be configured (explicitly or implicitly) to Opt-out of tracking as part of Deauth.
- STA may choose to ask AP to delete any data collected using this identifier in current or past associations
656

11. STA initiates DeAuth/Disassoc
659

- STA sets Opt-in Control bit to 0
- STA sets Clear Data bit to 1
661

12. DeAuth/Disassoc 663 (Device ID Element
(Element ID, Length, Opt-in Control=0x02, ID Blob))

FIG. 6B

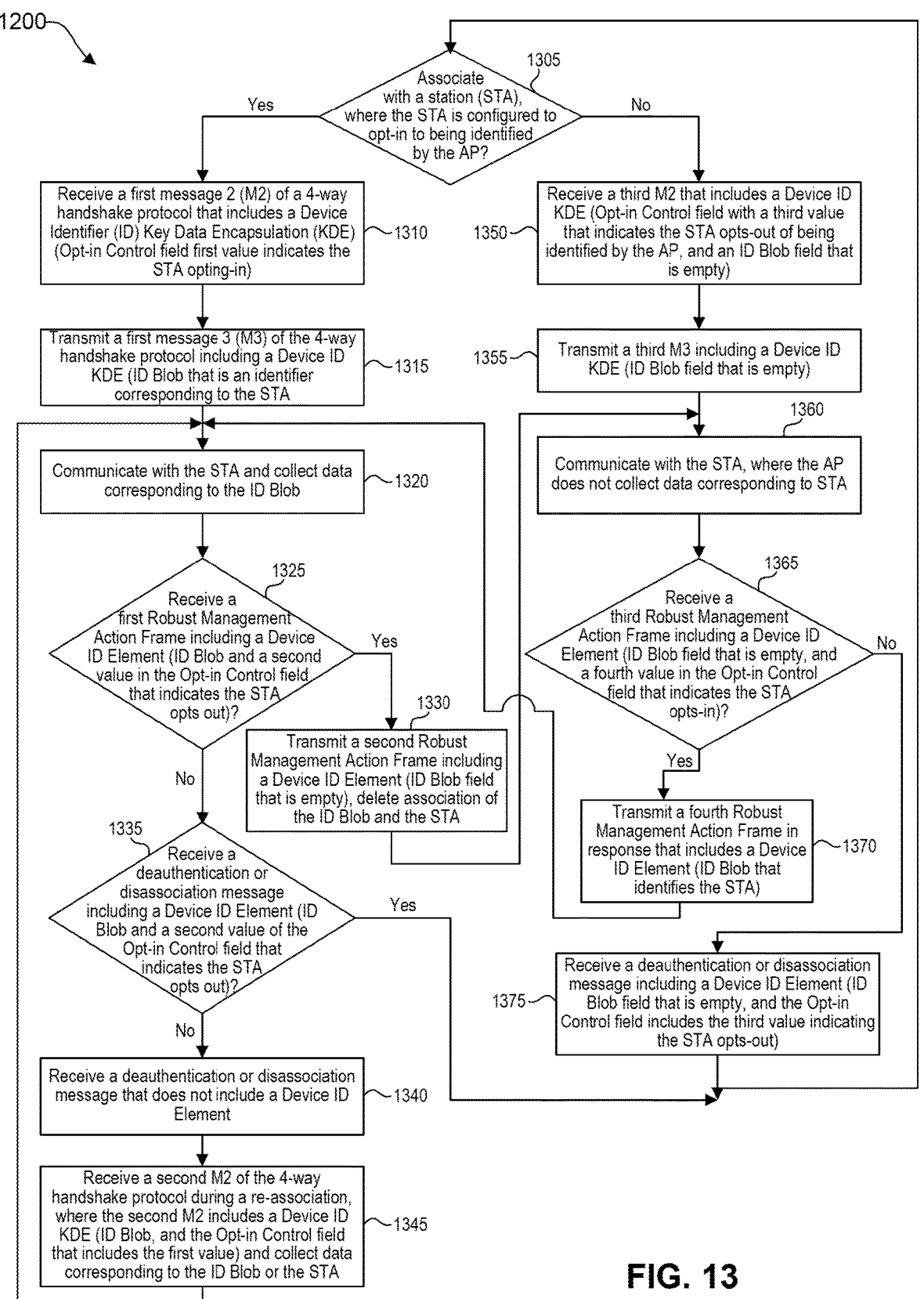

1200

1305
Associate with a station (STA), where the STA is configured to opt-in to being identified by the AP?

Yes

No

1310
Receive a first message 2 (M2) of a 4-way handshake protocol that includes a Device Identifier (ID) Key Data Encapsulation (KDE) (Opt-in Control field first value indicates the STA opting-in)

1315
Transmit a first message 3 (M3) of the 4-way handshake protocol including a Device ID KDE (ID Blob that is an identifier corresponding to the STA 1320
Communicate with the STA and collect data corresponding to the ID Blob 1325
Receive a first Robust Management Action Frame including a Device ID Element (ID Blob and a second value in the Opt-in Control field that indicates the STA opts out)?

Yes

1330
Transmit a second Robust Management Action Frame including a Device ID Element (ID Blob field that is empty), delete association of the ID Blob and the STA No 1335
Receive a deauthentication or disassociation message including a Device ID Element (ID Blob and a second value of the Opt-in Control field that indicates the STA opts out)?

Yes

No

1340
Receive a deauthentication or disassociation message that does not include a Device ID Element 1345
Receive a second M2 of the 4-way handshake protocol during a re-association, where the second M2 includes a Device ID KDE (ID Blob, and the Opt-in Control field that includes the first value) and collect data corresponding to the ID Blob or the STA 1350
Receive a third M2 that includes a Device ID KDE (Opt-in Control field with a third value that indicates the STA opts-out of being identified by the AP, and an ID Blob field that is empty)

1355
Transmit a third M3 including a Device ID KDE (ID Blob field that is empty)

1360
Communicate with the STA, where the AP does not collect data corresponding to STA 1365
Receive a third Robust Management Action Frame including a Device ID Element (ID Blob field that is empty, and a fourth value in the Opt-in Control field that indicates the STA opts-in)?

No

Yes

1370
Transmit a fourth Robust Management Action Frame in response that includes a Device ID Element (ID Blob that identifies the STA)

1375
Receive a deauthentication or disassociation message including a Device ID Element (ID Blob field that is empty, and the Opt-in Control field includes the third value indicating the STA opts-out)

FIG. 13

STATION IDENTIFIER OPT-IN

CROSS-REFERENCE TO RELATED APPLICATION

This application claims benefit of U.S. Provisional Patent Application No. 63/388,133, filed on Jul. 11, 2022 and U.S. Provisional Patent Application No. 63/406,896, filed on Sep. 15, 2022, which are incorporated herein by reference in their entireties.

BACKGROUND

Field

The embodiments relate generally to wireless devices with network assigned identifier(s) that enable user tracking in a wireless communication system.

Related Art

Security is defined in IEEE P802.11REVme D0.0, Draft Standard for Information technology—Telecommunications and information exchange between systems Local and metropolitan area networks—Specific requirements, Part 11: Wireless LAN Medium Access Control (MAC) and Physical Layer (PHY) Specifications "IEEE P802.11REVme" to secure the exchange of information in a wireless network.

SUMMARY

Some embodiments include an apparatus, method, and computer program product for station (STA) identifier opt-in in a wireless network such as a Wireless LAN (WLAN) system. Some embodiments include a STA that can associate with an access point (AP) of a wireless network, where the STA is configured to opt-in to being identified by the AP. The STA can transmit a first message 2 (M2) of a 4-way handshake protocol during the association, where the first M2 includes a Device Identifier (ID) Key Data Encapsulation (KDE) that includes an Opt-in Control field, where a first value of the Opt-in Control field indicates the STA opts-in to being identified by the AP. The STA can receive a first message 3 (M3) of the 4-way handshake protocol including a Device ID KDE including an ID Blob, where the ID Blob corresponds to the STA. The STA can communicate with the AP, where the first value enables the AP to collect data about the STA during the communication. In some embodiments, the first M2 Device ID KDE includes an ID Blob field that is empty.

In some embodiments, opt-out of being identified by the AP post association, the STA can transmit a first Robust Management Action Frame that includes a Device ID Element that includes the ID Blob and a second value in the Opt-in Control field, where the second value indicates the STA opts-out of being identified by the AP. The STA can receive a second Robust Management Action Frame in response to the transmission of the first Robust Management Action Frame, where the second Robust Management Action Frame includes a Device ID Element that includes an ID Blob field that is empty. In some embodiments, the STA can second communicate with the AP, where the AP is precluded from collecting data about the STA and the second communication.

In some embodiments, the STA can transmit a deauthentication or disassociation message including a Device ID Element that includes the ID Blob and a second value of the Opt-in Control field, where the second value indicates the STA opts-out of being identified by the AP. The second value can indicate that the AP is to delete any data collected corresponding to the ID Blob or any other ID Blob corresponding to the STA. The STA can transmit a deauthentication or disassociation message that does not include a Device ID Element.

In some embodiments, the STA can re-associate with the AP or a second AP of the wireless network, and transmit a second M2 of the 4-way handshake protocol during the re-association, where the second M2 includes a Device ID KDE including the ID Blob, and the Opt-in Control field that includes the first value, where the AP collects data corresponding to the ID Blob or a second ID Blob. In some embodiments, the wireless network may assign the second ID Blob during re-association, and the AP can collect data corresponding to the second ID Blob.

In some embodiments, the STA can transmit a third M2 of a 4-way handshake protocol during an association with an AP, where the third M2 includes a Device ID KDE that includes an Opt-in Control field, where a third value of the Opt-in Control field indicates the STA opts-out of being identified by the AP, and an ID Blob field that is empty. The STA can receive a third M3 of the 4-way handshake protocol including a Device ID KDE including the ID Blob field that is empty, and communicate with the AP, where the AP is precluded from collecting data about the STA during the communication based at least on the third value.

In some examples, to opt-in the STA to being identified by the AP and can transmit a third Robust Management Action Frame including a Device ID Element that includes the ID Blob field that is empty, and a fourth value in the Opt-in Control field, where the fourth value indicates the STA opts-in to being identified by the AP. The STA can receive a fourth Robust Management Action Frame in response to the transmission of the third Robust Management Action Frame, where the fourth Robust Management Action Frame includes a Device ID Element that includes an ID Blob, where the ID Blob corresponds to the STA. The STA can also communicate with the AP, where the AP collects data corresponding to the ID Blob based at least on the fourth value. The STA can also transmit a deauthentication or disassociation message that includes a Device ID Element that includes the ID Blob field that is empty and the Opt-in Control field that includes the third value.

Some embodiments include an AP that can receive a first M2 of a 4-way handshake protocol during an association with a STA, where the first M2 includes a Device ID KDE that includes an Opt-in Control field, where a first value of the Opt-in Control field indicates the STA opts-in to being identified by the AP. The AP can transmit a first M3 of the 4-way handshake protocol including a Device ID KDE that includes an ID Blob, where the ID Blob is an identifier corresponding to the STA. The AP can collect data using the ID Blob during communication with the STA based at least on the first value. In some examples, the first M2 Device ID KDE includes an ID Blob field that is empty.

In some embodiments, the AP can receive a first Robust Management Action Frame including a Device ID Element that includes the ID Blob and a second value in the Opt-in Control field, where the second value indicates the STA opts-out of being identified by the AP. The AP can transmit a second Robust Management Action Frame in response to the first Robust Management Action Frame, where the second Robust Management Action Frame includes a Device ID Element that includes an ID Blob field that is empty.

The AP can delete association of the ID Blob and the STA, and second communicate with the STA, where the AP does not collect data corresponding to the STA. The AP can receive a deauthentication or disassociation message including a Device ID Element that includes the ID Blob and a second value of the Opt-in Control field, where the second value indicates the STA opts-out of being identified by the AP. The AP can delete association of the ID Blob or any other ID Blob corresponding to the STA based at least on the second value. The AP can also receive a deauthentication or disassociation message that does not include a Device ID Element. The AP can receive a second M2 of the 4-way handshake protocol during a re-association with the STA, where the second M2 Device ID KDE includes a Device ID Element, the ID Blob, and the Opt-in Control field that includes the first value, and collect data corresponding to the ID Blob or the STA based at least on the first value.

In some embodiments, the AP can receive a third M2 of a 4-way handshake protocol during an association with a STA, where the third M2 includes a Device ID KDE that includes an Opt-in Control field, where a third value of the Opt-in Control field indicates the STA opts-out of being identified by the AP, and an ID Blob field that is empty. The AP can transmit a third M3 of the 4-way handshake protocol including a Device ID KDE that includes the ID Blob field that is empty, and communicate with the STA, where the AP does not collect data corresponding to STA during the communication based at least on the third value. In some embodiments, the AP can receive a third Robust Management Action Frame including a Device ID Element that includes the ID Blob field that is empty, and a fourth value in the Opt-in Control field, wherein the fourth value indicates the STA opts-in to being identified by the AP, and transmits a fourth Robust Management Action Frame in response to the transmission of the third Robust Management Action Frame, where the fourth Robust Management Action Frame includes a Device ID Element that includes an ID Blob, where the ID Blob is an identifier corresponding to the STA. The AP can second communicate with the STA, and collect data about the STA during the second communication based at least on the fourth value.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

FIG. 6B illustrates an example system for opting-out and clearing data on deauthentication/disassociation supporting STA identifier opt-in, according to some embodiments of the disclosure.

FIG. 13 illustrates an example method for an access point (AP) supporting STA identifier Opt-in, according to some embodiments of the disclosure.

Figure 1:
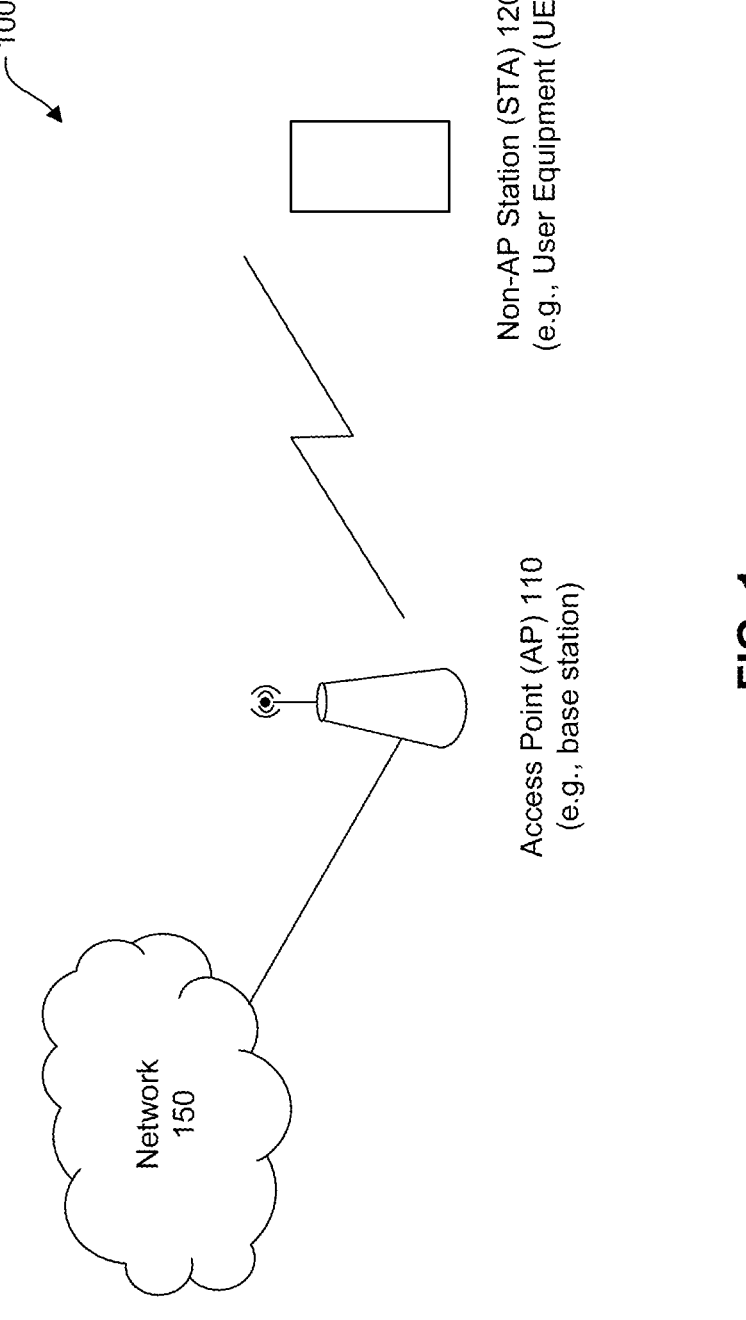
FIG. 1 illustrates an example system for station (STA) identifier opt-in, in accordance with some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some wireless systems assign identifiers that enable a station (STA) to be monitored and/or tracked even without user consent. Some identifiers may diminish or even nullify the privacy enhancements introduced by Random and Changing Media Access Control (MAC) (RCM) addresses. For example, a network assigned identifier (NAID) may nullify the benefits static MAC addresses that allow a STA to be monitored by a network or tracked by a loyalty program (e.g., grocery store, hotel, and airline.) In some examples, a wireless network assigns a new identifier per (re)association to reduce or prevent eavesdropping, but the wireless network correlates the new identifier with data collected about the STA across associations and re-associations. In other words, RCM may still in use by the STA but the use of the NAID allows an AP of the wireless network to detect when a STA returns, even if the STA is using a different MAC address from the one the STA used during a previous association.

Figure 11:
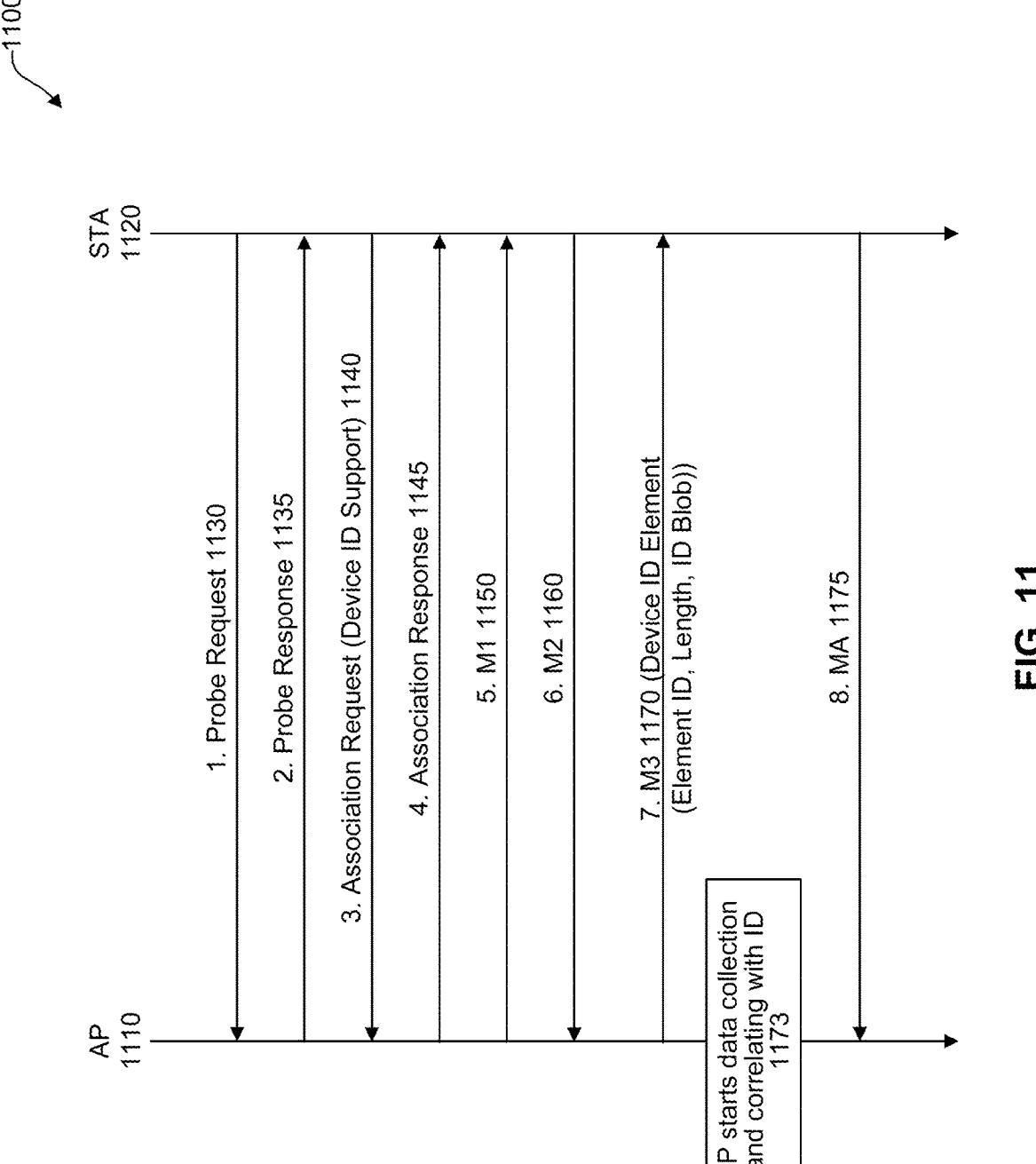
FIG. 11 illustrates an example system for creating an identifier for a STA, according to some embodiments of the disclosure.

FIG. 11 illustrates example system 1100 that does not support any mechanism for STA identifier obliteration, according to some embodiments of the disclosure. System 1100 shows an access point (AP) 1100 of a wireless network that communicates with a station (STA) 1120. STA 1120 associates with AP 1110.

At 1130, STA 1120 can transmit a probe request.

At 1135, AP 110 can transmit a probe response.

At 1140, STA 1120 can transmit an association request message.

At 1145, AP 1110 can transmit an association response message to STA 1120.

At 1150, AP 1110 transmits message 1 (M1) of a 4-Way handshake protocol as described in IEEE P802.11REVme.

At 1160, STA 1120 transmits message 2 (M2) in response.

At 1170 AP 1110 can transmit message 3 (M3) that includes a Device identifier (ID) Element that can include an Element ID, a length, and an ID Blob. The ID Blob is an identifier that corresponds to STA 1120.

At 1173, AP 1110 can start collecting and correlating data with the ID Blob and hence STA 1120, without input from STA 1120.

At 1175, STA 1120 can transmit message 4 (M4) to complete the 4-Way handshake protocol.

A wireless network can include AP 1110 and other APs. Upon re-association with the wireless network via AP 1110 or the other APs, additional ID Blobs can be assigned to STA 1120. The wireless network can monitor and track STA 1120 that can include collecting information corresponding to STA 1120 and the user of STA 1120 (e.g., which websites are visited, how often, geolocation, etc.)

Some embodiments herein enable a STA to opt-in to being tracked and monitored by a wireless network (e.g., via one or more APs in the wireless networks with which the STA associates), or to opt-out of being tracked and monitored. For example, settings in the STA can enable the STA to opt-in or opt-out of being tracked and monitored. When a STA opts-out of being tracked and monitored, the wireless network does not collect data corresponding to the identifier corresponding to the STA. Further, settings in the STA can indicate to the wireless network whether data collected corresponding to one or more identifiers (e.g., ID Blobs) are to be deleted from the wireless network. Thus, the embodiments herein can increase privacy of STAs communicating via a wireless network, and hence increase privacy of the associated users of the STAs.

FIG. 1 illustrates example system 100 for station identifier opt-in, in accordance with some embodiments of the disclosure. System 100 includes AP 110 (e.g., base station) that provides STA 120 (e.g., user equipment (UE)) with access to network 150. In some examples, AP 110 can be a station and STA 120 can be a non-AP station. STA 120 can be an electronic device that may include but is not limited to a cellular phone, a smart phone, a tablet, a personal digital assistant (PDA), or a laptop. Network 150 may include but is not limited to, any of or any combination of local area networks (LANs), metropolitan area networks (MANs), wireless local area networks (WLANs), and/or the Internet. STA 120 in proximity to AP 110 or other APs in the wireless network (not shown), may associate with AP 110 or another AP in the wireless network. Some embodiments enable a STA (e.g., STA 120) to indicate whether the STA opts-in to or opts-out of monitoring and tracking by a wireless network. In response to the indications, the wireless network (e.g., one or more APs in the wireless network) can respond to the indications by: not collecting data correlated to any identifiers that correspond to the STA, deleting any identifiers that correspond to the STA, and/or deleting any collected data correlated to any identifiers that correspond to the STA.

Figure 2:
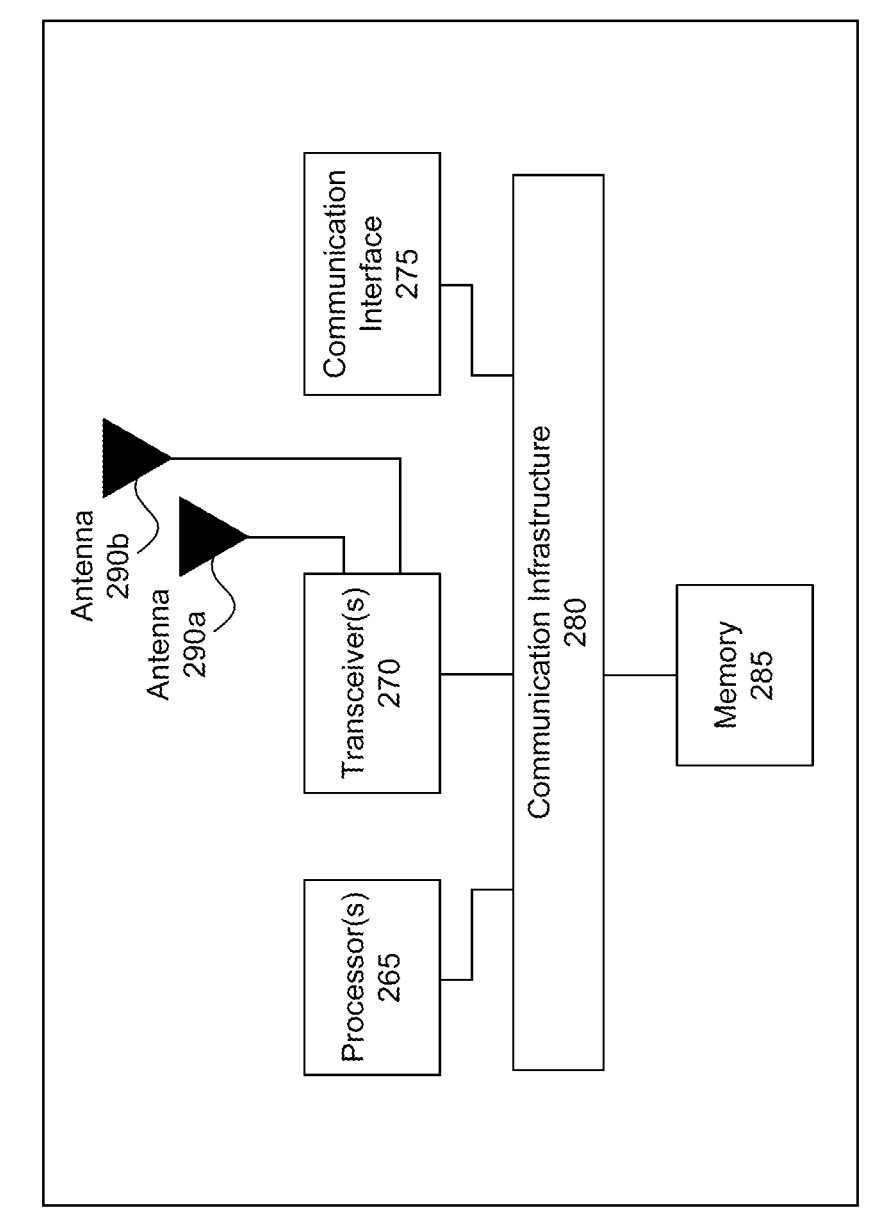
FIG. 2 illustrates a block diagram of an example wireless system supporting STA identifier opt-in, according to some embodiments of the disclosure.

FIG. 2 illustrates a block diagram of example wireless system 200 supporting STA identifier opt-in, according to some embodiments of the disclosure. For explanation purposes and not a limitation, FIG. 2 may be described with reference to elements from FIG. 1. For example, system 200 may be any of the electronic devices (e.g., AP 110 and/or STA 120) of system 100. System 200 includes one or more processors 265, transceiver(s) 270, communication interface 275, communication infrastructure 280, memory 285, and antenna 290. Memory 285 may include random access memory (RAM) and/or cache, and may include control logic (e.g., computer instructions) and/or data. One or more processors 265 can execute the instructions stored in memory 285 to perform operations enabling wireless system 200 to transmit and receive wireless communications, including the operations for performing station identifier opt-in functions herein. In some embodiments, one or more processors 265 can be "hard coded" to perform the functions herein. Transceiver(s) 270 transmits and receives wireless communications signals including wireless communications supporting station identifier opt-in according to some embodiments, and may be coupled to one or more antennas 290 (e.g., 290a, 290b). In some embodiments, a transceiver 270a (not shown) may be coupled to antenna 290a and different transceiver 270b (not shown) can be coupled to antenna 290b. Communication interface 275 allows system 200 to communicate with other devices that may be wired and/or wireless. Communication infrastructure 280 may be a bus. Antenna 290 may include one or more antennas that may be the same or different types.

Some use cases for STA identifier opt-in and opt-out include loyalty programs, parental control over children's electronic devices, and removing identifiers from a wireless network after troubleshooting technical issues. These are described further below.

Some embodiments enable STA 120 to opt-in to being identified and tracked by a wireless network that allows the user of STA 120 to take advantage of membership privileges of a loyalty program (e.g., a hotel loyalty program), such as free WiFi access. The hotel's wireless network can assign an identifier when STA 120 first associates with the wireless network and opts-in. The identifier allows STA 120 to be recognized by the wireless network so that STA 120 can access the Internet via the hotel's wireless network without having to sign-in and provide hotel loyalty membership information and/or without having to pay for access to the hotel's wireless network upon re-association with the hotel's wireless network. The wireless network can collect information corresponding to the identifier when STA 120 communicates with the wireless network. Upon check-out, however, the user may want to opt-out of having their electronic device (e.g., STA 120) identified and tracked by the wireless network. In other words, the user may want one or more identifiers corresponding to STA 120 as well as all the information collected correlated to the one or more identifiers to be forgotten (e.g., deleted) from the wireless network.

In another example, parents may want to be able to opt-in or turn on tracking/monitoring of their children's electronic devices (e.g., smart phones, computers) on a home wireless network. The home wireless network (e.g., AP 110) can assign an identifier to a child's device (e.g., STA 120) to track STA 120 and websites (e.g., a school website or homework-related sites) that are accessed by STA 120 via the home wireless network. When the parent/guardian/supervisor determines that the tracking of STA 120 is to be lifted (e.g., after the child completes their homework assignment), the parent can opt-out of tracking STA 120. For example, STA 120 can transmit an indication to the home wireless network that causes the identifier(s) and data collected corresponding to STA 120 to be deleted from the home wireless network. If one or more identifiers are assigned by the home wireless network, then all of the one or more STA identifiers and corresponding information collected can be deleted by the home wireless network (e.g., AP 110.)

In some examples, an identifier can be assigned to STA 120 to troubleshoot a technical issue regarding accessing a wireless network. After the troubleshooting is complete, a user may opt-out of tracking that causes the identifier and/or data collected corresponding to the identifier to be deleted from the wireless network. Thus, the user's privacy is enhanced.

In some embodiments, the input to opt-in or opt-out STA 120 from tracking by a wireless network is received by STA 120 via a user interface (UI) or graphical user interface (GUI) on STA 120, (e.g., a user chooses to be forgotten by a loyalty program, or a parent turns off tracking on a child's electronic device.) In some embodiments, STA 120 can recognize an Application Programming Interface (API) selection (e.g., a selection of "Check-out" from a hotel's loyalty application running on STA 120) that causes STA 120 to opt-out of tracking for increased privacy. In some examples, privacy settings (e.g., default or user-selected) in an operating system (OS) of STA 120 can trigger a pop-up on a display of STA 120 that requests input regarding opting-in or opting-out of tracking by a wireless network. In some examples, the OS can correlate values of an application and/or functions running on STA 120 (e.g., calendar information and a geo-location functions) to determine whether STA 120 opts-in or opts-out of network monitoring and/or tracking by the wireless network. In some embodiments, an end user may not be satisfied with the current wireless network being used. In these situations, the end user may command STA 120 to forget the current wireless network and operate in other wireless networks. In these situations, STA 120 may request that all information about STA 120 stored in the current wireless network be erased.

Figure 3:
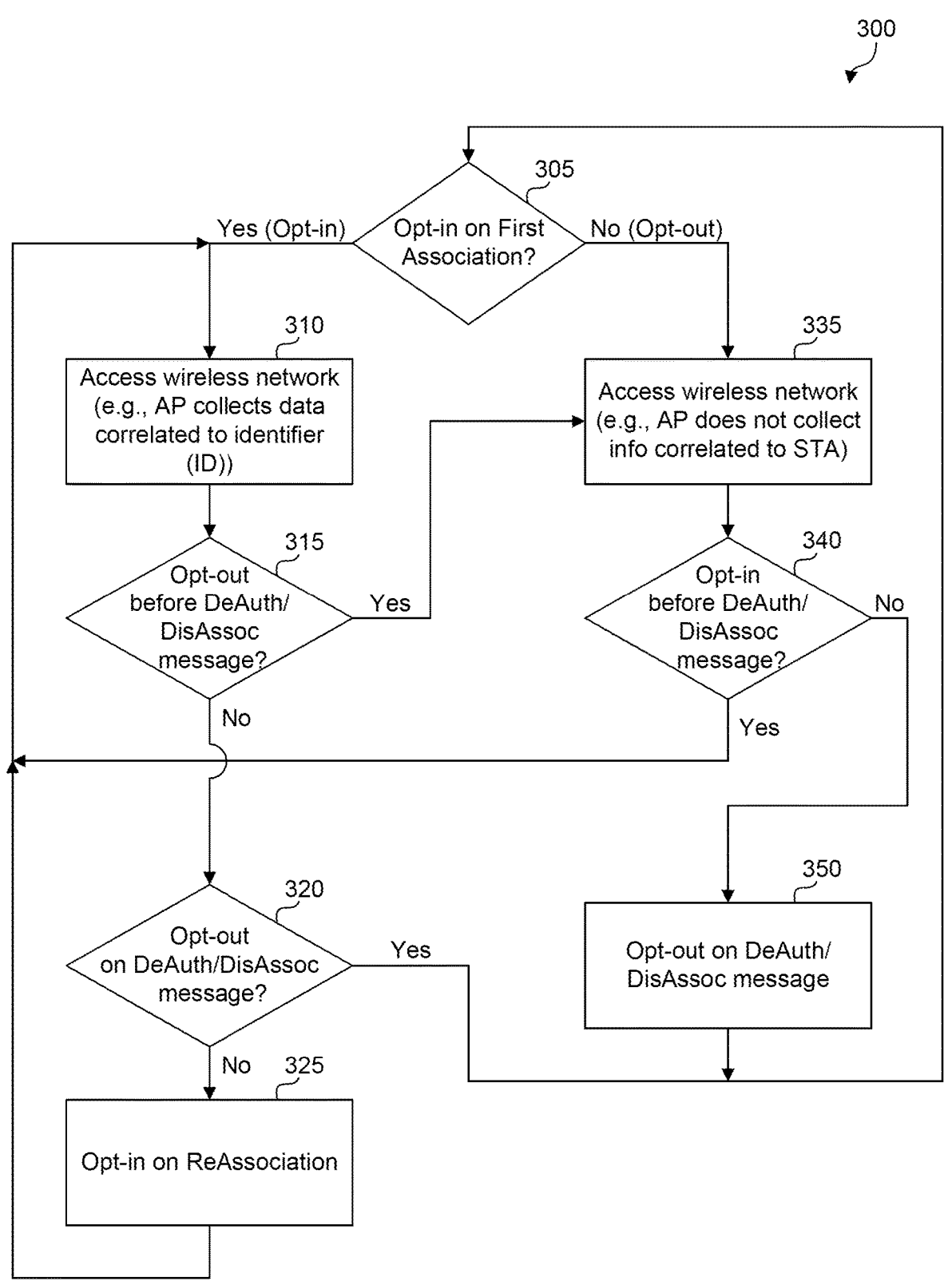
FIG. 3 illustrates an example method supporting STA identifier opt-in, according to some embodiments of the disclosure.

FIG. 3 illustrates example method 300 supporting STA identifier opt-in, according to some embodiments of the disclosure. For explanation purposes and not a limitation, FIG. 3 may be described with reference to elements from other figures within the disclosure. For example, portions of method 300 can be performed by AP 110 and/or STA 120 of FIG. 1, or system 200 of FIG. 2.

At 305, system 200 can determine whether to opt-in on first association with a wireless network that include one or more APs including AP 110 of FIG. 1. When system 200 (e.g., STA 120) determines to opt-in, method 300 proceeds to 310. When system 200 determines to opt-out, method 300 proceeds to 335. To inform the wireless network (e.g., AP 110 whether STA 120 opts-in or opts-out of tracking, some embodiments include an Opt-in Control field as described in FIG. 9A and Device ID Key Data Encapsulation (KDE) that includes the Opt-in Control field as described in FIG. 9B.

Figure 9A:
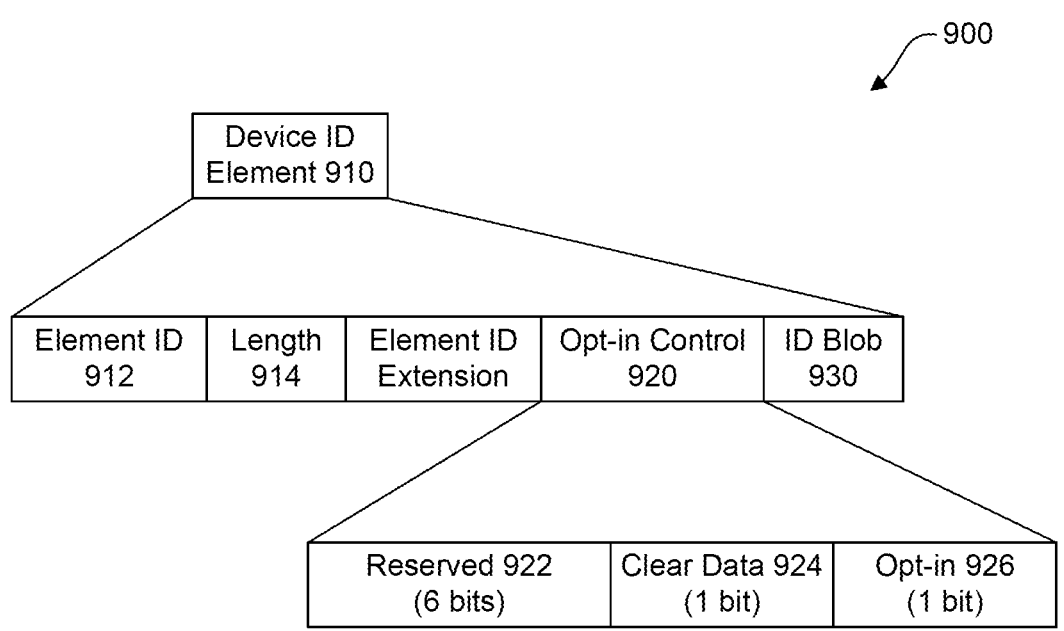
FIG. 9A illustrates an example Opt-in Control field supporting STA identifier opt-in, according to some embodiments of the disclosure.

FIG. 9A illustrates example 900 with Opt-in Control field 920 supporting STA identifier opt-in, according to some embodiments of the disclosure. Device identifier (ID) Element field 910 can include Element ID field 912, Length field 914, Element ID Extension field, Opt-in Control field 920, and ID Blob field 930, where ID Blob field 930 can be an identifier assigned to a STA (e.g., STA 120) by a wireless network (e.g., AP 110.) Opt-in Control field 920 can include Reserved field 922, Clear Data field 924, and Opt-in field 926. In some examples, Opt-in Control field 920 can be a byte in length. When STA 120 opts-in to be tracked by the wireless network, STA 120 can communicate Opt-in Control field 920 with a corresponding value of Opt-in field 926 (e.g., Opt-in field 926 value set to '1'). When STA 120 opts-out of being tracked by the wireless network, STA 120 can communicate Opt-in Control field 920 with a corresponding value of Opt-in field 926 (e.g., Opt-in field 926 value set to '0'). When STA 120 opts-in to be tracked that includes allowing data collection corresponding to one or more assigned identifiers of STA 120, STA 120 can communicate Opt-in Control field 920 with a corresponding value of Clear Data field 924 (e.g., Clear Data field 924 value set to '0'). When STA 120 opts-out of being tracked that includes deleting the data collection corresponding to any assigned identifiers of STA 120, STA 120 can communicate Opt-in Control field 920 with a corresponding value of Clear Data field 924 (e.g., Clear Data field 924 value set to '1').

Figure 9B:
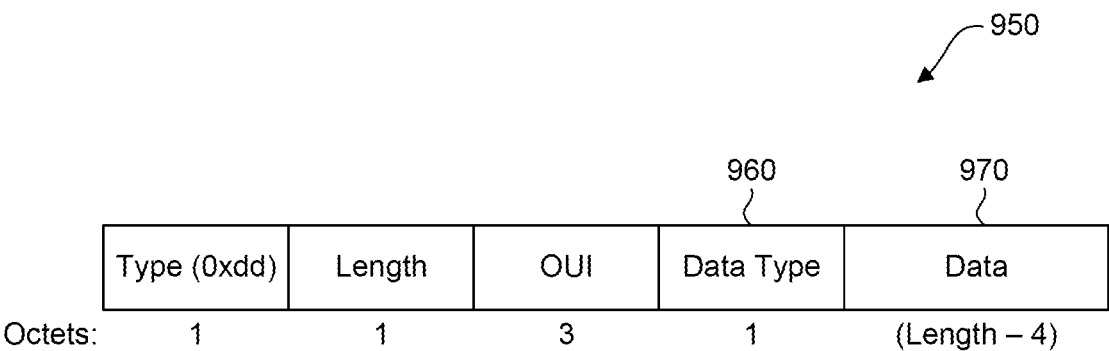
FIG. 9B illustrates an example Device ID Key Data Encapsulation (KDE) with Opt-in Control field supporting STA identifier opt-in, according to some embodiments of the disclosure.

FIG. 9B illustrates example 950 of Device ID Key Data Encapsulation (KDE) with Opt-in Control field supporting STA identifier opt-in, according to some embodiments of the disclosure. During a 4-way handshake protocol exchange, message 2 (M2) and message 3 (M3) can include a Device ID Element that is encapsulated in KDE format as shown in FIG. 9B, called herein a Device ID KDE. In example 950, Type can be set to value 0xdd, and Length equals the length of the organizationally unique identifier (OUI), Data Type, and Data. OUI can be set to value 0x00-OF-AC, and Data Type field 960 can be set to a next available, non-assigned value. In some embodiments, Data Type field 960 is assigned value 16 which signals a Device ID KDE. In some embodiments, Data field 970 can include two fields, Opt-in Control field 920 (e.g., 1 octet in length) and ID Blob field 930 (e.g., variable length.) In some embodiments, a deauthentication/disassociation message can include a Device ID Element field 910. M2 or M3 exchanges can include a Device ID KDE as described in FIG. 9B.

Figure 4:
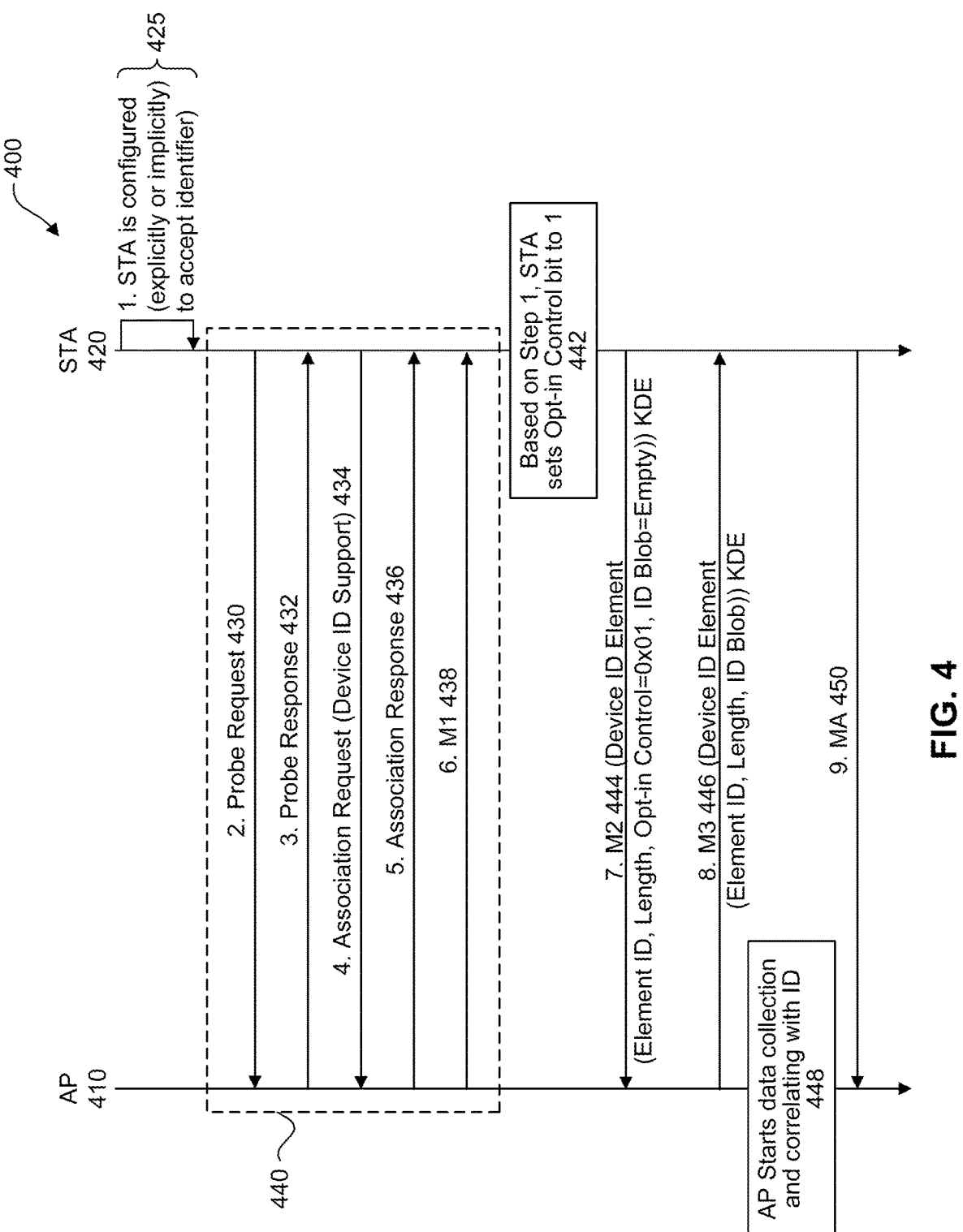
FIG. 4 illustrates an example system for opt-in on first association supporting STA identifier opt-in, according to some embodiments of the disclosure.

At 310, system 200 has determined to opt-in to access the wireless network where AP 310 collects information correlated to an identifier assigned to STA 320 by AP 310 as illustrated in FIG. 4.

FIG. 4 illustrates example system 400 for opt-in on first association supporting STA identifier opt-in, according to some embodiments of the disclosure. For explanation purposes and not a limitation, FIG. 4 may be described with reference to elements from other figures within the disclosure. For example, AP 410 and STA 420 of FIG. 4 may be AP 110 and STA 120 of FIG. 1.

At 425, STA 420 may be configured explicitly or implicitly to opt-in to tracking (e.g., to accept an identifier (e.g., Device ID Element) from the wireless network that corresponds to STA 420). STA 420 may be configured explicitly to opt-in or opt-out of the wireless network based on input from a UI/GUI of STA 420 (e.g., based on loyalty program benefits, technician assistance, and/or parental controls.) Some examples of implicit opt-in or opt-out of the wireless network may be based on API recognition, OS triggers based on privacy settings, and/or correlation of applications and/or functions running on STA 120. In some embodiments, the UI/GUI can display to an end user whether STA 420 has opted-in or opted-out of using a Device ID with the network. For example, selectable items (e.g., a double click) may provide additional information including but not limited to the time when the consent was given to opt-in and/or opt-out of using a Device ID, locations, and how many times a Device ID is used.

In some examples, when STA 420 associates to a wireless network for the first time, STA 420 may not know the wireless network performance and whether there are benefits to creating a Device ID with the wireless network. In these cases, the default operation can be to opt-out from a wireless network. If the end user finds later that it is beneficial to opt-in to identify with the wireless network, the end user may provide a consent and STA 420 may opt-in during the association or during the next associations. In some wireless networks, STA 420 may always need to authenticate or provide information in order to get Internet access through the wireless network. For instance, STA 420 may not be known and the wireless network needs to verify whether STA 420 is allowed to access the Internet. For these cases, the end user may desire to opt-in to use Device ID in order to automate the identification process. There may be other reasons why a user provides content to opt-in to Device ID.

In some embodiments, AP 410 can indicate that AP 410 supports Device IDs (e.g., Device ID Element 910) by transmitting an indication in a beacon (not shown), a probe response, and/or an association response. Accordingly AP 410 informs Device ID capable STAs (e.g., STA 420) that AP 410 is capable of receiving Device ID KDE in M2, and AP 410 can transmit Device ID KDE in M3 as described below.

At 430, STA 420 can transmit a Probe Request to AP 410.

At 432, AP 410 can transmit a Probe Response to STA 420 that includes an indication that AP 410 supports Device IDs.

At 434, STA 420 can transmit an Association Request that includes Device ID Support.

At 436, AP 410 can transmit an Association Response to STA 420 that includes an indication that AP 410 supports Device IDs.

At 438, AP 410 transmits message 1 (M1) of a 4-way handshake protocol described in IEEE P802.11REVme to STA 420.

For convenience and not a limitation, 430-438 exchanges may be referred to as 440.

At 442, STA 420 can set a value of Opt-in field 926 of Opt-in Control field 920 based on the opt-in or opt-out configurations at 425. In example 400, STA 420 selects opt-in.

At 444, STA 420 transmits message 2 (M2) of the 4-way handshake protocol that includes Device ID KDE, where Device ID Element field 910 includes an Element ID, a Length, Opt-in Control field 920, and ID Blob field 930, and where Opt-in Control field 920 corresponds to the opt-in configuration. In an example, Opt-in Control field 920 can include a value of 0x01 (e.g., Opt-in field 926 is set to '1') and the value of ID Blob field 930 is empty. In some examples, empty may mean one or zeros. In some embodiments, STA 420 can define an ID Blob value in M2 that is used to identify STA 420. Opt-in Control field 920 can include a value that reflects STA 420's desire to be identified by the STA-defined ID Blob value, and the Opt-in Control field 920 can be included in the Device ID KDE.

At 446, AP 410 can transmit message 3 (M3) of the 4-way handshake protocol, where M3 can include Device ID KDE where Device ID Element field 910 can include the Element ID and the Length received from STA 420. Device ID Element field 910 also includes ID Blob field 930 that includes an identifier that AP 410 assigned to STA 420.

At 448, AP 410 can begin collecting data and correlating the collected data with the identifier (e.g., the value in ID Blob field 930.) In some embodiments, if STA 420 defined the ID Blob value, and STA 420 opts-in, AP 410 can begin collecting data and correlating the collected data with the STA-defined ID Blob value.

At 450, STA 420 can transmit message 4 (M4) of the 4-way handshake protocol. STA 420 is associated with AP 410, and STA 420 can communicate via AP 410 with the wireless network, where AP 410 and the wireless network collects data corresponding to the identifier.

Returning to FIG. 3, method 300 proceeds to 315.

At 315, system 200 determines whether to opt-out post association (FIG. 5) and proceed to 335, or proceed to 320. In other words, system 200 determines whether to opt-out before transmitting a deauthentication/disassociation message.

Figure 5:
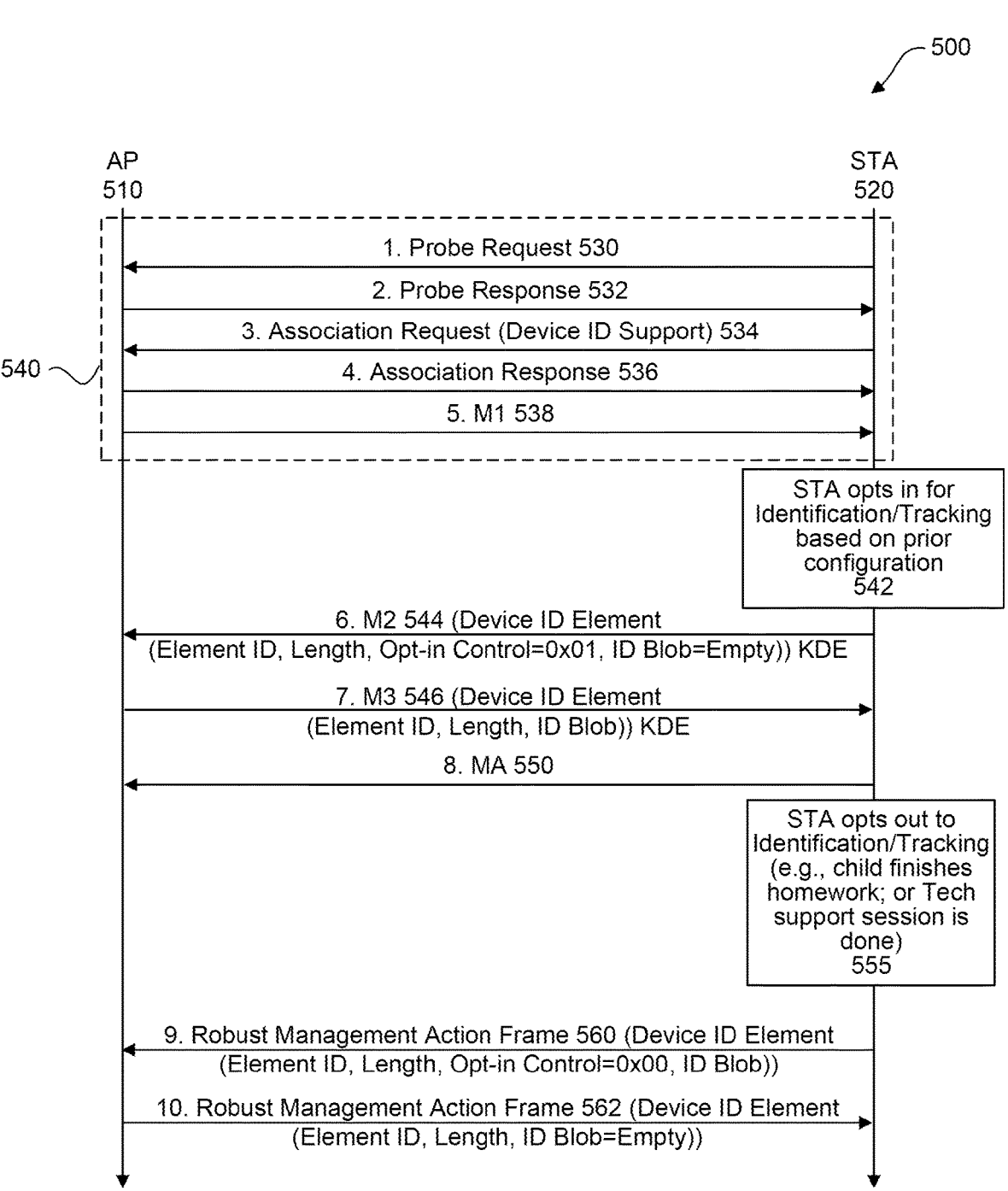
FIG. 5 illustrates an example system for opt-out post association supporting STA identifier opt-in, according to some embodiments of the disclosure.

FIG. 5 illustrates example system 500 for opt-out post association supporting STA identifier opt-in, according to some embodiments of the disclosure. In system 500, STA 520 opts-in to accept an identification for tracking on the wireless network including AP 510 during association. After association and before transmitting a deauthentication/disassociation message, STA 520 opts-out. For explanation purposes and not a limitation, FIG. 5 may be described with reference to elements from other figures within the disclosure. For example, AP 510 and STA 520 of FIG. 5 may be AP 410 and STA 420 of FIG. 4. Further, 530-538 exchanges referred to as 540 may be equivalent to 430-438 exchanges of 440 of FIG. 4.

At 542, STA 520 can set a value of Opt-in field 926 of Opt-in Control field 920 based on an opt-in configuration.

At 544, STA 520 transmits M2 that includes Device ID KDE, where Device ID Element field 910 includes an Element ID, a Length, Opt-in Control field 920, and ID Blob field 930, and where Opt-in Control field 920 corresponds to an opt-in configuration. In an example, Opt-in Control field 920 can include a value of 0x01 (e.g., Opt-in field 926 is set to '1') and the value of ID Blob field 930 is empty. In some examples, empty may mean one or zeros.

At 546, AP 510 can transmit M3, where M3 can include Device ID KDE. Device ID Element field 910 can include the Element ID and the Length received from STA 520. Device ID Element field 910 also includes ID Blob field 930 that includes an identifier that AP 510 assigned to STA 520.

At 550, STA 520 can transmit M4. STA 520 is associated with AP 510, and STA 520 can communicate via AP 510 with the wireless network, where AP 510 and the wireless network collects data corresponding to the identifier.

At 555, STA 520 opts-out of identification and tracking. In some examples, a parent can lift parent controls on a child device after homework is complete, or tech support session may be complete.

At 560, STA 520 transmits a Robust Management Action Frame Transmit a first Robust Management Action Frame including Device ID Element field 910 that includes the Element ID and the Length corresponding to STA 520, as well as the identifier assigned by AP 510 in ID Blob field 930, and a second value in Opt-in Control field 920 that corresponds to STA 520 opting-out. For example, Opt-in Control field 920 can include a value of 0x00 (e.g., Opt-in field 926 is set to '0'.)

At 562, in response, AP 510 transmits to STA 520 a second Robust Management Action Frame including Device ID Element field 910 that includes the Element ID and the Length corresponding to STA 520, and ID Blob field 930 that is empty. STA 520 is still associated with AP 510 and can continue to communicate with AP 510. AP 510, however, will not collect information corresponding to STA 520.

Returning to FIG. 3, method proceeds to 320 when system 200 does not opt-out post association.

At 320, system 200 determines whether to opt-out and send a deauthentication/disassociation message accordingly. When system 200 determines to opt-out on deauthentication/disassociation (FIG. 6A, FIG. 6B), method 300 returns to 305. Otherwise, method 300 proceeds to 325.

US 12,574,810 B2

11

Figure 6A:
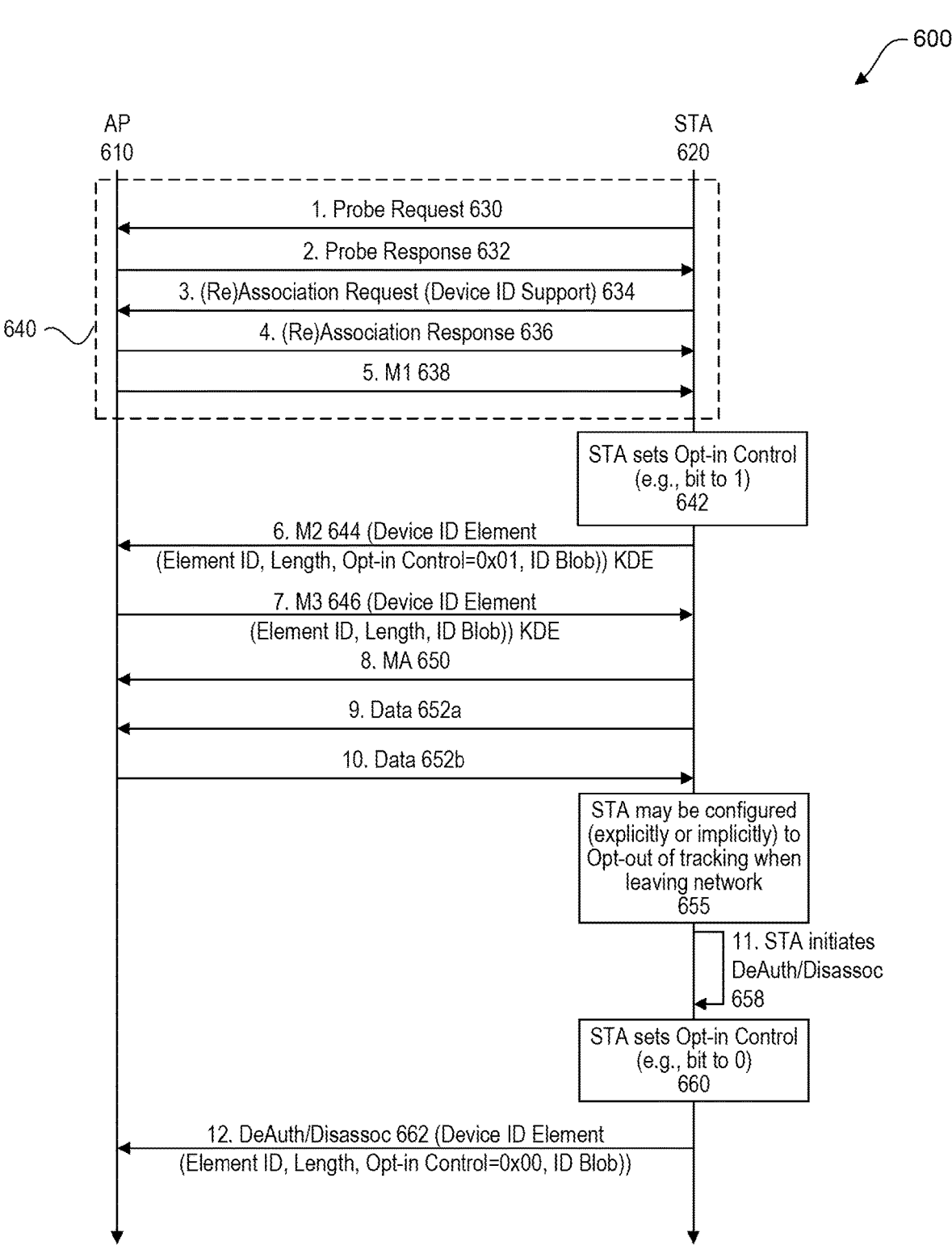
FIG. 6A illustrates an example system for opting-out on deauthentication/disassociation supporting STA identifier opt-in, according to some embodiments of the disclosure.

FIG. 6A illustrates example system 600 for opting-out on deauthentication/disassociation supporting STA identifier opt-in, according to some embodiments of the disclosure. For explanation purposes and not a limitation, FIG. 6A may be described with reference to elements from other figures within the disclosure. For example, AP 610 and STA 620 of FIG. 6 may be AP 410 and STA 420 of FIG. 4. Further, 630-638 exchanges referred to as 640 may be equivalent to 430-438 exchanges of 440 of FIG. 4.

At 642, STA 420 can set a value of Opt-in field 926 of Opt-in Control field 920 based on the opt-in configuration.

At 644, STA 620 transmits M2 that includes Device ID KDE. Device ID Element field 910 includes an Element ID, a Length, Opt-in Control field 920, and ID Blob field 930, where Opt-in Control field 920 corresponds to the opt-in configuration. In an example, Opt-in Control field 920 can include a value of 0x01 (e.g., Opt-in field 926 is set to '1') and the value of ID Blob field 930 is empty. In some examples, empty may mean one or zeros.

At 646, AP 610 can transmit M3 of the 4-way handshake protocol, where M3 can include Device ID KDE. Device ID Element field 910 can include the Element ID and the Length received from STA 620. Device ID Element field 910 also includes ID Blob field 930 that includes an identifier that AP 610 assigned to STA 620.

At 650, STA 620 can transmit M4. STA 620 is associated with AP 610.

At 652a and 652b, STA 620 can communicate via AP 610 with the wireless network, where AP 610 and the wireless network collect data corresponding to the identifier.

At 655, STA 620 may be configured explicitly or implicitly to opt-out of tracking when leaving the wireless network.

At 658, STA 620 initiates deauthentication/disassociation from AP 610 and the wireless network.

At 660, STA 620 can set a value of the Opt-in Control field 920 to correspond to the opt-out configuration. In an example, Opt-in Control field 920 can include a value of 0x00 (e.g., Opt-in field 926 is set to '0'.)

At 662, STA 620 can transmit a deauthentication/disassociation message that includes Device ID Element field 910 that can include the Element ID and Length corresponding to STA 620, Opt-in Control field 920 corresponding to the opt-out configuration described at 660, and ID Blob field 930 that includes the identifier. Subsequently, AP 610 deletes the correlation between the identifier and any other identifiers assigned to STA 620.

FIG. 6B illustrates example system 670 for opting-out and clearing data on deauthentication/disassociation supporting STA identifier opt-in, according to some embodiments of the disclosure. For explanation purposes and not a limitation, FIG. 6B may be described with reference to elements from other figures within the disclosure. For example, system 670 is the same as system 600 up to data exchanges at 652b, so those exchanges are not repeated here.

At 656, STA 620 may be configured explicitly or implicitly to opt-out of tracking when leaving the wireless network. In addition, STA 620 may choose to ask AP 610 to delete any data collected using the identifier or any other identifiers (e.g., from past associations or re-associations.)

At 659, STA 620 initiates deauthentication/disassociation from AP 610 and the wireless network.

At 661, STA 620 can set a value of Opt-in Control field 920 to correspond to the opt-out configuration. In an example, Opt-in Control field 920 can include a value of 0x02 (e.g., Opt-in field 926 is set to '0' and Clear Data field 924 is set to '1'.)

At 663, STA 620 can transmit a deauthentication/disassociation message that includes Device ID Element field 910 that can include the Element ID and Length corresponding to STA 620, Opt-in Control field 920 corresponding to the opt-out configuration described at 661, and ID Blob field 930 that includes the identifier. Subsequently, AP 610 deletes the correlation between the identifier and any other identifiers assigned to STA 620. In addition, AP 610 responds to the Clear Data value by deleting data collected correlated to the identifier and any other identifiers assigned to STA 620.

Returning to FIG. 3, method proceeds to 325 when system 200 does not opt-out on deauthentication/disassociation.

Figure 7:
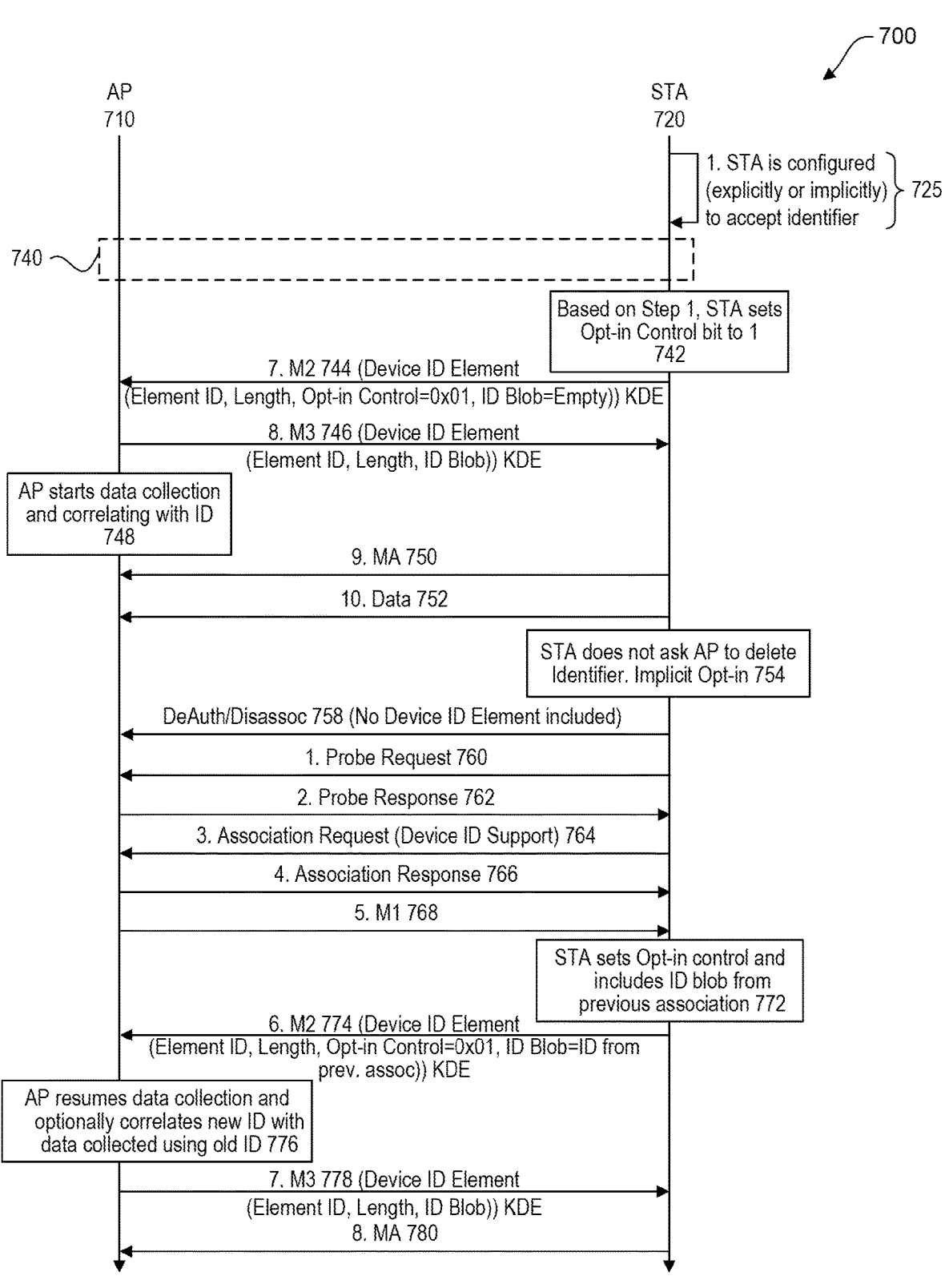
FIG. 7 illustrates an example system for opt-in on re-association supporting STA identifier opt-in, according to some embodiments of the disclosure.

At 325, system 200 opts-in on re-association with the wireless network (FIG. 7.)

FIG. 7 illustrates example system 700 for opt-in on re-association supporting STA identifier opt-in, according to some embodiments of the disclosure. For explanation purposes and not a limitation, FIG. 7 may be described with reference to elements from other figures within the disclosure. For example, AP 710 and STA 720 of FIG. 4 may be AP 410 and STA 420 of FIG. 4. Further exchanges in system 700 are the same as the exchanges in system 400. For example, 725, 740, 742, 744, 746, 748, and 750 can be the same as 425, 440, 442, 444, 446, 448, and 450. Thus, those exchanges are not repeated here.

At 752, STA 720 can communicate via AP 710 with the wireless network, where AP 710 and the wireless network collect data corresponding to the identifier.

At 754, STA 720 does not opt-out on deauthentication/disassociation. In other words, STA 720 does not ask AP 710 to delete the identifier assigned to STA 720. Instead, STA 720 implicitly opts-in, or remains opted-in.

At 758, STA 720 transmits a deauthentication/disassociation message that does not include a Device ID Element. In some examples, Device ID Element field 910 is empty or includes one or more zeros.

When STA 720 returns to the wireless network, STA 720 performs re-association exchanges 760, 762, 764, 766, and 768.

At 772, STA 720 can set a value of Opt-in field 926 of Opt-in Control field 920 based on the opt-in configuration. In an example, Opt-in Control field 920 can include a value of 0x01 (e.g., Opt-in field 926 is set to '1'.)

At 774, STA 720 transmits M2 that includes Device ID KDE. Device ID Element field 910 can include the Element ID and Length corresponding to STA 720, Opt-in Control field 920 as described at 772, and ID Blob field 930, where the value of ID Blob field 930 includes the identifier from a previous association (e.g., at 746.)

At 776, AP 710 resumes data collection corresponding to the identifier, or assigns a new identifier and correlates the new identifier with data collected using the identifier from the previous association.

At 778, AP 710 can transmit M3 where M3 can include Device ID KDE. Device ID Element field 910 can include the Element ID and the Length received from STA 720. Device ID Element field 910 also includes ID Blob field 930 that includes the identifier from a previous association or a new identifier that AP 710 assigned to STA 720.

At 780, STA 720 can transmit M4 of the 4-way handshake protocol. STA 720 is re-associated with AP 710, and STA 720 can communicate via AP 710 with the wireless network.

Returning to FIG. 3 and method 300 at 335.

At 335, system may associate with AP 110 but opt-out (see FIG. 8 below.)

At 340, system 200 determines whether to opt-in post association and return to 310 to allow tracking with an identifier, or to remain opted-out and proceed to 350. In other words, system 200 determines whether to opt-in before transmitting a deauthentication/disassociation message or to remain opted-out.

Figure 8:
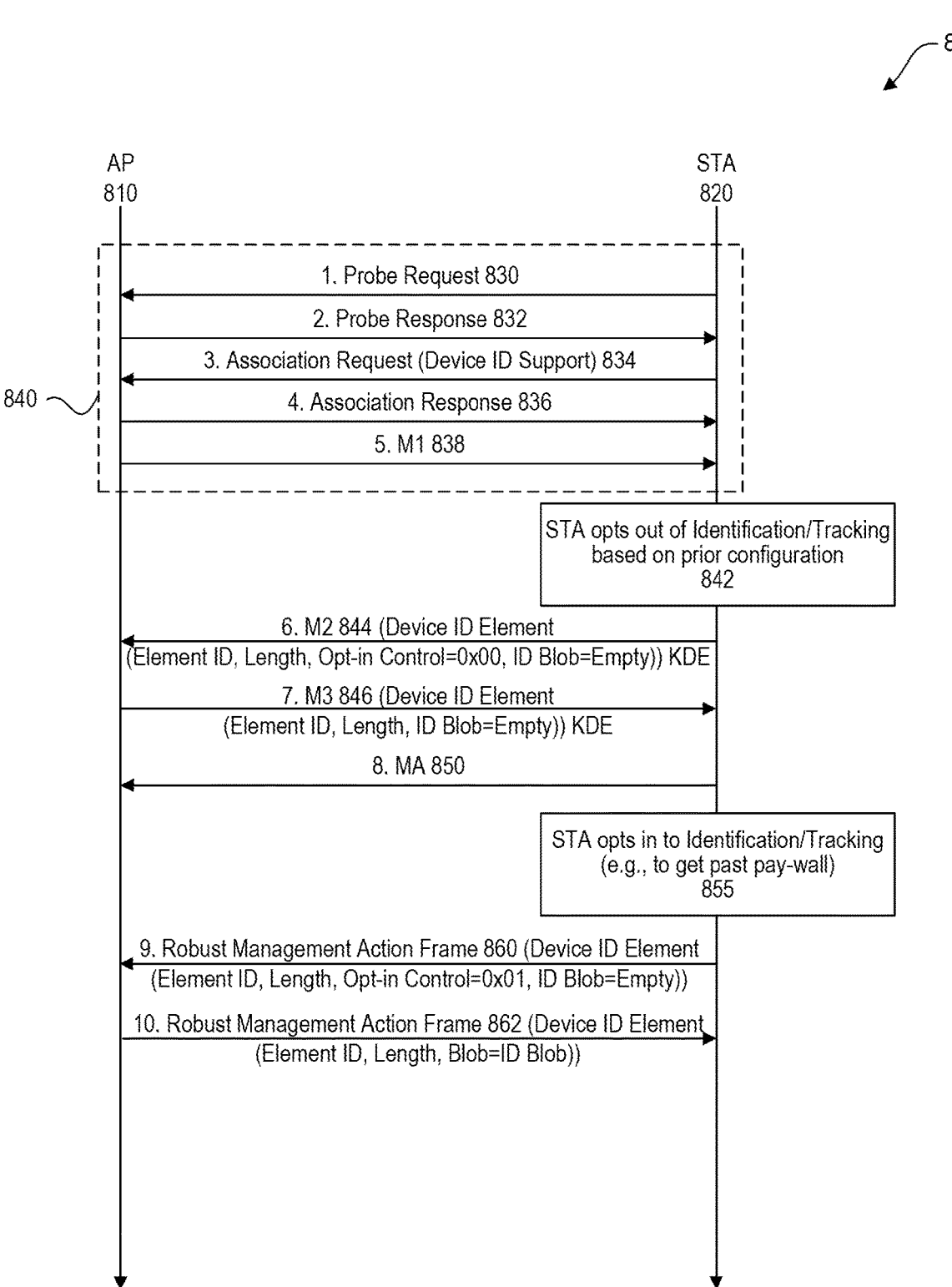
FIG. 8 illustrates an example system for opt-out association and opt-in post association, according to some embodiments of the disclosure.

FIG. 8 illustrates example system 800 for opt-out association and opt-in post association, according to some embodiments of the disclosure. For explanation purposes and not a limitation, FIG. 8 may be described with reference to elements from other figures within the disclosure. For example, AP 810 and STA 820 of FIG. 8 may be AP 410 and STA 420 of FIG. 1. Further exchanges 840 in system 800 are the same as the exchanges 440 in system 400 so those exchanges are not repeated here.

At 842, STA 820 opts out of identification and tracking based on a prior configuration of STA 820.

At 844, STA 820 transmits M2 that includes Device ID KDE. Device ID Element field 910 can include an Element ID, a Length, Opt-in Control field 920, and ID Blob field 930, where Opt-in Control field 920 corresponds to the opt-out configuration. In an example, Opt-in Control field 920 can include a value of 0x00 (e.g., Opt-in field 926 is set to '0') and the value of ID Blob field 930 is empty. In some examples, empty may mean one or zeros.

At 846, AP 810 can transmit M3, where M3 can include Device ID KDE. Device ID Element field 910 can include the Element ID and the Length received from STA 820. Device ID Element field 910 also includes ID Blob field 930 that is empty or includes one or more zeros. In other words, AP 810 and the wireless network do not assign an identifier that corresponds to STA 820, and therefore do not collect any information corresponding to STA 820.

At 850, STA 820 can transmit M4. STA 820 is associated with AP 810, and STA 820 can communicate via AP 810 with the wireless network, where AP 810 and the wireless network do not collect data corresponding to STA 820.

At 860, STA 820 transmits a Robust Management Action Frame Transmit a first Robust Management Action Frame including a Device ID Element field 910 that includes the Element ID and the Length corresponding to STA 820, as well as ID Blob field 930, and Opt-in Control field 920 that corresponds to STA 820 opting-in. For example, Opt-in Control field 920 can include a value of 0x01 (e.g., Opt-in field 926 is set to '1'.)

At 862, in response, AP 810 transmits to STA 820 a second Robust Management Action Frame including a Device ID Element field 910 that includes the Element ID and the Length corresponding to STA 820, and ID Blob field 930 that includes an identifier that corresponds to STA 820. STA 820 is still associated with AP 810 and can continue to communicate with AP 810. AP 810 and the wireless network will collect information corresponding to the identifier and STA 820.

Returning to FIG. 3 and method 300 at 350.

At 350, system 200 can leave the network and remain opted-out. For example, system 200 can transmit a deauthentication/disassociation message that includes Device ID Element field 910 that can include the Element ID and Length corresponding to STA 120, ID Blob field 930 that is empty, and Opt-in Control field 920 corresponding to the opt-out configuration. In an example, Opt-in Control field 920 can include a value of 0x00 (e.g., Opt-in field 926 is set to '0'.)

In some embodiments, the methods and systems described herein can be used with legacy devices (e.g., devices with constant MAC addresses), with networks and/or electronic devices implementing Network Assigned Identifiers (NAID) such as described in IEEE 802.11 Task Group BH (802.11 TGbh), and/or privacy enhanced capable networks as described in 802.11 Task Group BI (802.11 TGbi).

Figure 12:
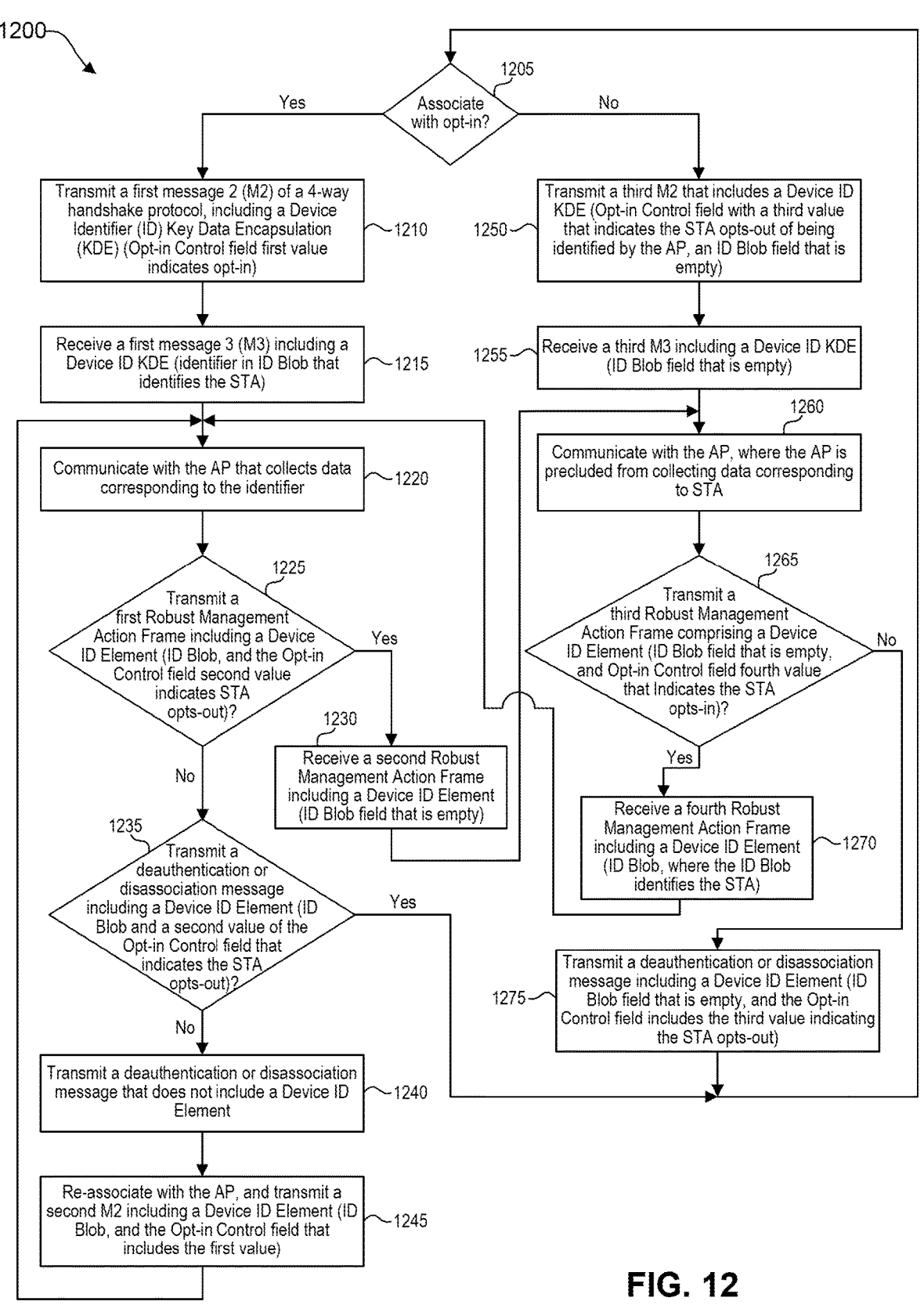
FIG. 12 illustrates an example method for a STA supporting STA identifier Opt-in, according to some embodiments of the disclosure.

FIG. 12 illustrates example method 1200 for a STA supporting STA identifier Opt-in, according to some embodiments of the disclosure. For explanation purposes and not a limitation, FIG. 12 may be described with reference to elements from other figures within the disclosure. For example, method 1200 can be performed by STA 120 of FIG. 1, or system 200 of FIG. 2.

At 1205, system 200 can determine whether to associate with opt-in or opt-out configuration. When system determines to associate with an access point (AP) of a wireless network, where STA 120 is explicitly or implicitly configured to opt-in to being identified by the AP, method 1200 proceeds to 1210. When STA 120 is configured to opt-out, method 1200 proceeds to 1250.

At 1210, system 200 can transmit a first M2 of a 4-way handshake protocol, including a Device ID KDE with Opt-in Control field with first value that indicates the STA opts-in to being identified by the AP.

At 1215, system 200 can receive a first M3 including a Device ID KDE (with an identifier in ID Blob field 930 that identifies STA 120.

At 1220, system 200 can communicate with AP 110 that collects data corresponding to the identifier corresponding to STA 120.

At 1225, system 200 can determine whether to opt-out post association. When determines to opt-out post association, system 200 transmits a first Robust Management Action Frame including a Device ID Element (with identifier in ID Blob, and a second value in the Opt-in Control field that indicates STA 120 opts-out), method 1200 proceeds to 1230. Otherwise, method 1200 proceeds to 1235.

At 1230, system 200 can receive a second Robust Management Action Frame including a Device ID Element (with ID Blob field that is empty.) Method 1200 proceeds to 1260.

At 1235, system 200 can determine whether to transmit a deauthentication/disassociation message indicating an opt-out. When system 200 transmits a deauthentication/disassociation message (opting-out), the message includes a Device ID Element (with identifier in ID Blob and a second value of the Opt-in Control field that indicates the STA opts out). After transmitting the deauthentication/disassociation message, method 1200 returns to 1205. Otherwise, method 1200 proceeds to 1240.

At 1240, system 200 can transmit a deauthentication/disassociation message (implicit opt-in) that does not include a Device ID Element, and method 1200 proceeds to 1245.

At 1245, system 200 can re-associate with AP 110, and transmit a second M2 including a Device ID Element (identifier in the ID Blob, and the Opt-in Control field that includes the first value). Method 1200 returns to 1220.

At 1250, system 200 can transmit a third M2 that includes a Device ID KDE (Opt-in Control field with a third value that indicates STA 120 opts-out of being identified by AP 110, an ID Blob field that is empty.)

At 1255, system 200 can receive a third M3 including a Device ID KDE (ID Blob field that is empty.)

At 1260, system 200 can communicate with AP 110, where the AP 110 does not collect data corresponding to STA 120.

At 1265, system 200 can determine whether to opt-in post association. When system 200 determines to opt-in post association, system 200 can transmit a third Robust Management Action Frame including a Device ID Element (ID Blob field that is empty, and a fourth value in the Opt-in Control field that indicates STA 120 opts-in), and method 1200 proceeds to 1270. Otherwise, when system 200 does not opt-in post association, method 1200 proceeds to 1275.

At 1270, system 200 can receive a fourth Robust Management Action Frame including a Device ID Element (with identifier in ID Blob field 930, where the identifier identifies STA 120.) Method 1200 proceeds to 1220.

At 1275, system 200 can transmit a deauthentication/disassociation message with an opt-out, the deauthentication/disassociation message includes a Device ID Element (ID Blob field that is empty, and the third value (e.g., opt-out) in the Opt-in Control field), and method 1200 returns to 1205.

FIG. 13 illustrates example method 1300 for an access point (AP) supporting STA identifier Opt-in, according to some embodiments of the disclosure. For explanation purposes and not a limitation, FIG. 13 may be described with reference to elements from other figures within the disclosure. For example, method 1300 can be performed by AP 110 of FIG. 1, or system 200 of FIG. 2.

At 1305, system 200 can associate with a station (e.g., STA 120), where STA 120 is configured to opt-in to being identified by AP 110, or opt-out of being identified by AP 110. When AP 110 associates with STA 120 that is configured to opt-in, method 1300 proceeds to 1310. Otherwise, method 1300 proceeds to 1350.

At 1310, system 200 can receive a first M2 of a 4-way handshake protocol that includes a Device ID KDE (Opt-in Control field whose first value indicates the STA opting-in).

At 1315, system 200 can transmit a first message 3 (M3) of the 4-way handshake protocol including a Device ID KDE (ID Blob field 930 that includes an identifier corresponding to STA 120.

At 1320, system 200 can communicate with STA 120 and collect data corresponding to the identifier.

At 1325, when system 200 receives a first Robust Management Action Frame including a Device ID Element (ID Blob and the Opt-in Control field with a second value that indicates the STA opts-out), method 1200 proceeds to 1330. Otherwise, method 1300 proceeds to 1335.

At 1330, system 200 can transmit a second Robust Management Action Frame including a Device ID Element (ID Blob field that is empty), and delete association of the identifier of ID Blob field 930 and STA 120.

At 1335, when system 200 receives a deauthentication or disassociation message including a Device ID Element (ID Blob and the Opt-in Control field with a second value that indicates the STA opts-out), method 1300 returns to 1305. Otherwise, method 1300 proceeds to 1340.

At 1340, system 200 can receives deauthentication or disassociation message that does not include a Device ID Element (e.g., implicit opt-in), and method 1300 proceeds to 1345.

At 1345, system 200 can receive a second M2 of the 4-way handshake protocol during a re-association, where the second M2 includes a Device ID KDE (ID Blob, and the Opt-in Control field that includes the first value) and collect data corresponding to the ID Blob or STA 120. Method 1300 returns to 1320.

At 1350, system 200 can receive a third M2 that includes a Device ID KDE (Opt-in Control field with a third value that indicates the STA opts-out of being identified by the AP, and an ID Blob field that is empty.)

At 1355, system 200 can transmit a third M3 including a Device ID KDE (ID Blob field that is empty.)

At 1360, system 200 can communicate with STA 120, where AP 110 does not collect data corresponding to STA 120.

At 1365, when system 200 receives a third Robust Management Action Frame including a Device ID Element (ID Blob field that is empty, and the Opt-in Control field with a fourth value that indicates the STA opts-in), method 1300 proceeds to 1370. Otherwise, method 1300 proceeds to 1375.

At 1370, system 200 can transmit a fourth Robust Management Action Frame in response that includes a Device ID Element (ID Blob that identifies STA 120.) Method 1300 returns to 1320.

At 1375, when system 200 receives a deauthentication or disassociation message including a Device ID Element (ID Blob field that is empty, and the third value in the Opt-in Control field indicates STA 120 opts-out), method 1300 returns to 1305.

Figure 10:
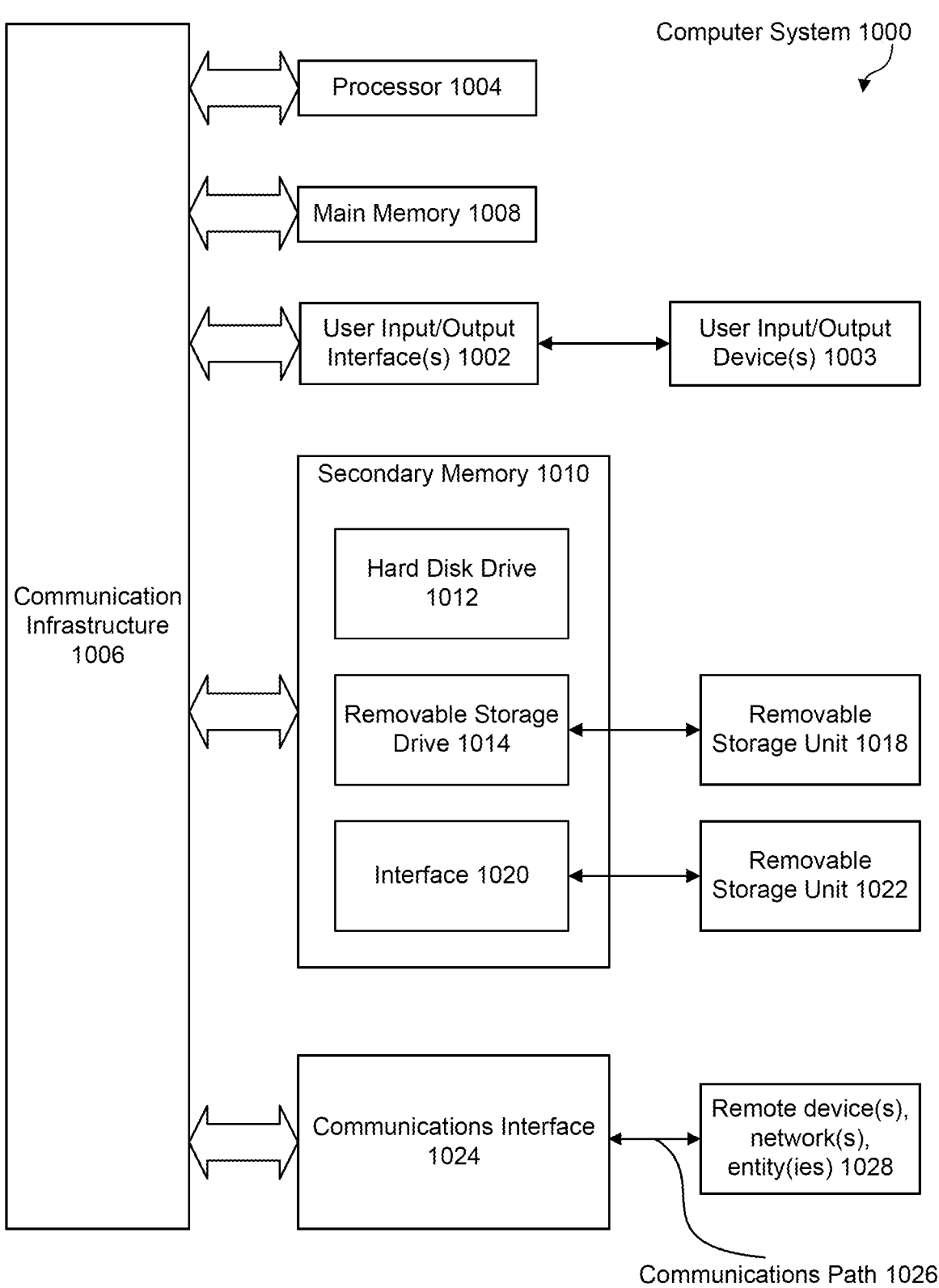
FIG. 10 is an example computer system for implementing some embodiments or portion(s) thereof.

Various embodiments can be implemented, for example, using one or more well-known computer systems, such as computer system 1000 shown in FIG. 10. Computer system 1000 can be any well-known computer capable of performing the functions described herein. For example, and without limitation, system 200 of FIG. 2, method 300 of FIG. 3, method 1200 of FIG. 12, method 1300 of FIG. 13, (and/or other apparatuses and/or components shown in the figures) may be implemented using computer system 600, or portions thereof.

Computer system 1000 includes one or more processors (also called central processing units, or CPUs), such as a processor 1004. Processor 1004 is connected to a communication infrastructure 1006 that can be a bus. One or more processors 1004 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 also includes user input/output device(s) 1003, such as monitors, keyboards, pointing devices, etc., that communicate with communication infrastructure 1006 through user input/output interface(s) 1002. Computer system 1000 also includes a main or primary memory 1008, such as random access memory (RAM). Main memory 1008 may include one or more levels of cache. Main memory 1008 has stored therein control logic (e.g., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to some embodiments, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1000, main memory 1008, secondary memory 1010 and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 10. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A station (STA) comprising:

a memory; and a processor coupled to the memory, configured to:

transmit a message 2 (M2) of a 4-way handshake protocol during an association with an access point (AP), wherein the M2 comprises an M2 Device Identifier (ID) Key Data Encapsulation (KDE) that includes an ID Blob field that includes a STA-defined ID Blob value, and an Opt-in Control field, wherein a first value of the Opt-in Control field indicates the STA opts-in to being identified by the AP;

receive a first message 3 (M3) of the 4-way handshake protocol comprising an M3 Device ID KDE that includes the STA-defined ID Blob value; and communicate with the AP, wherein the first value allows the AP to collect data corresponding to the STA-defined ID Blob value about the STA during the communication.

2. The STA of claim 1, wherein to opt-out the STA from being identified by the AP, the processor is further configured to:

transmit a first Robust Management Action Frame comprising a first Device ID Element that includes the STA-defined ID Blob value and a second value in the Opt-in Control field, wherein the second value indicates the STA opts-out of being identified by the AP; and receive a second Robust Management Action Frame subsequent to the transmission of the first Robust Management Action Frame, wherein the second Robust Management Action Frame comprises a second Device ID Element that includes a second ID Blob field that is empty.

3. The STA of claim 2, wherein the processor is further configured to subsequently communicate with the AP, wherein the AP is precluded from collecting data about the STA during the subsequent communications.

4. The STA of claim 1, wherein the processor is further configured to transmit a deauthentication or disassociation message comprising a Device ID Element that includes the STA-defined ID Blob value and a second value of the Opt-in Control field, wherein the second value indicates the STA opts-out of being identified by the AP.

5. The STA of claim 4, wherein the second value indicates that the AP is to delete any data collected corresponding to the STA-defined ID Blob value or any other ID Blob value corresponding to the STA.

6. The STA of claim 1, wherein the processor is further configured to transmit a deauthentication or disassociation message that does not include a Device ID Element.

7. The STA of claim 6, wherein the processor is further configured to:

re-associate with the AP or a second AP of a wireless network;

transmit a second M2 of the 4-way handshake protocol during the re-association, wherein the second M2 comprises a second M2 Device ID KDE including the STA-defined ID Blob value, and the Opt-in Control field that includes the first value, wherein the AP collects data corresponding to the STA-defined ID Blob value.

8. A method of operating a station (STA) comprising:

transmitting a first message 2 (M2) of a 4-way handshake protocol during an association with an access point (AP), wherein the first M2 comprises an M2 Device Identifier (ID) Key Data Encapsulation (KDE) that includes an Opt-in Control field and an ID Blob field that is empty, wherein a first value of the Opt-in Control field indicates the STA opts-out of being identified by the AP;

receiving a message 3 (M3) of the 4-way handshake protocol comprising an M3 Device ID KDE including the ID Blob field that is empty;

communicating with the AP, wherein the AP is precluded from collecting data about the STA during the communication based at least on the first value; and transmitting a deauthentication message comprising a Device ID Element that includes a second Opt-in Control field including the first value.

9. An access point (AP) comprising:

a memory; and a processor coupled to the memory, configured to:

receive a message 2 (M2) of a 4-way handshake protocol during an association with a station (STA), wherein the first M2 comprises an M2 Device Identifier (ID) Key Data Encapsulation (KDE) that includes an Opt-in Control field, wherein a first value of the Opt-in Control field indicates the STA opts-in to being identified by the AP;

transmit a message 3 (M3) of the 4-way handshake protocol comprising an M3 Device ID KDE including an ID Blob value, where the ID Blob value is an identifier corresponding to the STA;

collect data using the ID Blob value during communication with the STA based at least on the first value; and receive a deauthentication message comprising a Device ID Element that includes a second value of the Opt-in Control field that indicates the STA opts-out of being identified by the AP.

10. The AP of claim 9, wherein the ID Blob value corresponds to an ID Blob field in the M2 Device ID KDE that is empty.

11. The AP of claim 9, wherein the Device ID Element includes the ID Blob value, the processor is further configured to delete association of the ID Blob value or any other ID Blob value corresponding to the STA based at least on the second value.

12. The AP of claim 9, wherein the processor is further configured to receive a deauthentication or disassociation message that does not include a Device ID Element.

13. The AP of claim 12, wherein the processor is further configured to:

receive a second M2 of the 4-way handshake protocol during a re-association with the STA, wherein the second M2 comprises a second M2 Device ID KDE including the ID Blob value, and a second Opt-in Control field that includes the first value; and collect data corresponding to the ID Blob value based at least on the first value.

14. A method of operating an access point (AP) comprising:

receiving a message 2 (M2) of a 4-way handshake protocol during an association with a station (STA), wherein the M2 comprises an M2 Device Identifier (ID) Key Data Encapsulation (KDE) that includes an Opt-in Control field and an ID Blob field that is empty, wherein a first value of the Opt-in Control field indicates the STA opts-out of being identified by the AP;

transmitting a message 3 (M3) of the 4-way handshake protocol comprising an M3 Device ID KDE including the ID Blob field that is empty;

communicating with the STA, wherein the AP does not collect data corresponding to STA during the communication based at least on the first value; and receiving a deauthentication message comprising a Device ID Element that includes a second Opt-in Control field including the first value.

* * * * *